United States Patent [19]

Ikei et al.

[11] Patent Number: 5,003,457
[45] Date of Patent: Mar. 26, 1991

[54] SIMULTANEOUS DATA AND ELECTRIC POWER TRANSMITTING/RECEIVING SYSTEM

[75] Inventors: Mitsuru Ikei; Masahiko Hashimoto; Takeshi Noguchi, all of Shimodate, Japan

[73] Assignee: Hitachi Chemical Company, Ltd., Japan

[21] Appl. No.: 291,135

[22] Filed: Dec. 28, 1988

[30] Foreign Application Priority Data

Dec. 29, 1987 [JP] Japan ................ 62-334213
Dec. 7, 1988 [JP] Japan ................ 63-307784

[51] Int. Cl.$^5$ ............................ G06F 1/00; H04L 1/00
[52] U.S. Cl. ................................. 364/133; 340/310 A
[58] Field of Search ................ 340/825.65, 825.28, 340/825.29, 310 R, 310 A; 370/100.1; 364/133

[56] References Cited

U.S. PATENT DOCUMENTS

| | | | |
|---|---|---|---|
| 3,924,224 | 12/1975 | Dyer | 340/310 A |
| 3,944,981 | 3/1976 | Akita et al. | 340/310 A |
| 4,139,737 | 2/1979 | Shimada et al. | 340/310 A |
| 4,163,218 | 7/1979 | Wu | 340/310 A |
| 4,228,422 | 10/1980 | Perry | 340/310 R |
| 4,408,291 | 10/1983 | Gunzberg et al. | 340/310 R |

*Primary Examiner*—Allen R. MacDonald
*Attorney, Agent, or Firm*—Jones, Askew & Lunsford

[57] ABSTRACT

A data and power transmitting/receiving system applicable to a home automation system. Plural terminal units and associated communication units are connected via a common signal bus. Each terminal unit may operate an electrical load to be controlled remotely, and may include control switches for operating such loads at a number of remote locations. Each communication unit generates an n-bit data signal, each bit corresponding to the desired function of a corresponding terminal unit. A sync signal is combined with the data signal in time sequence such that the respective communication units can identify which signal operates which terminal unit. The sync signals also can supply DC power to the respective communication units.

14 Claims, 20 Drawing Sheets

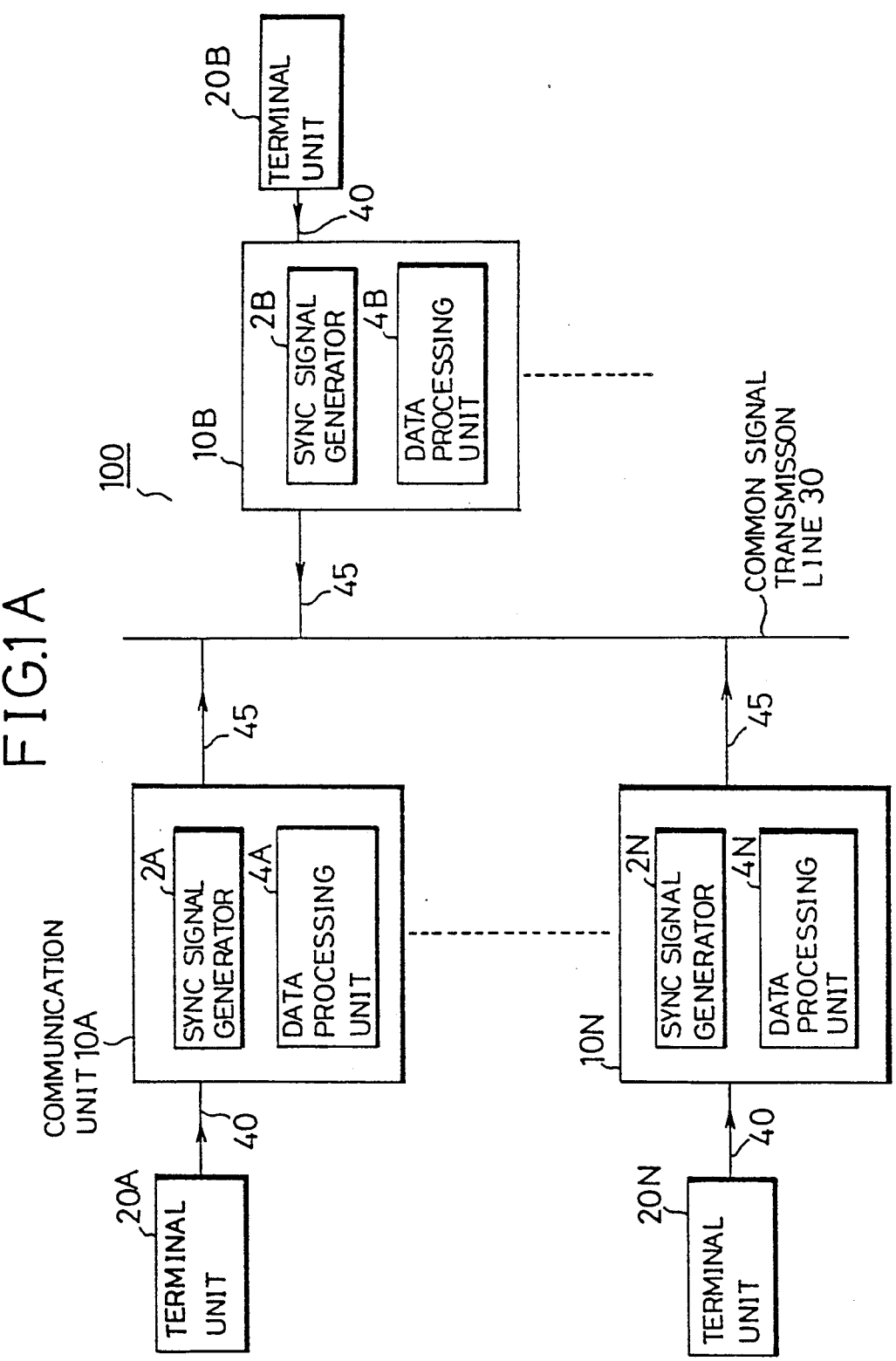

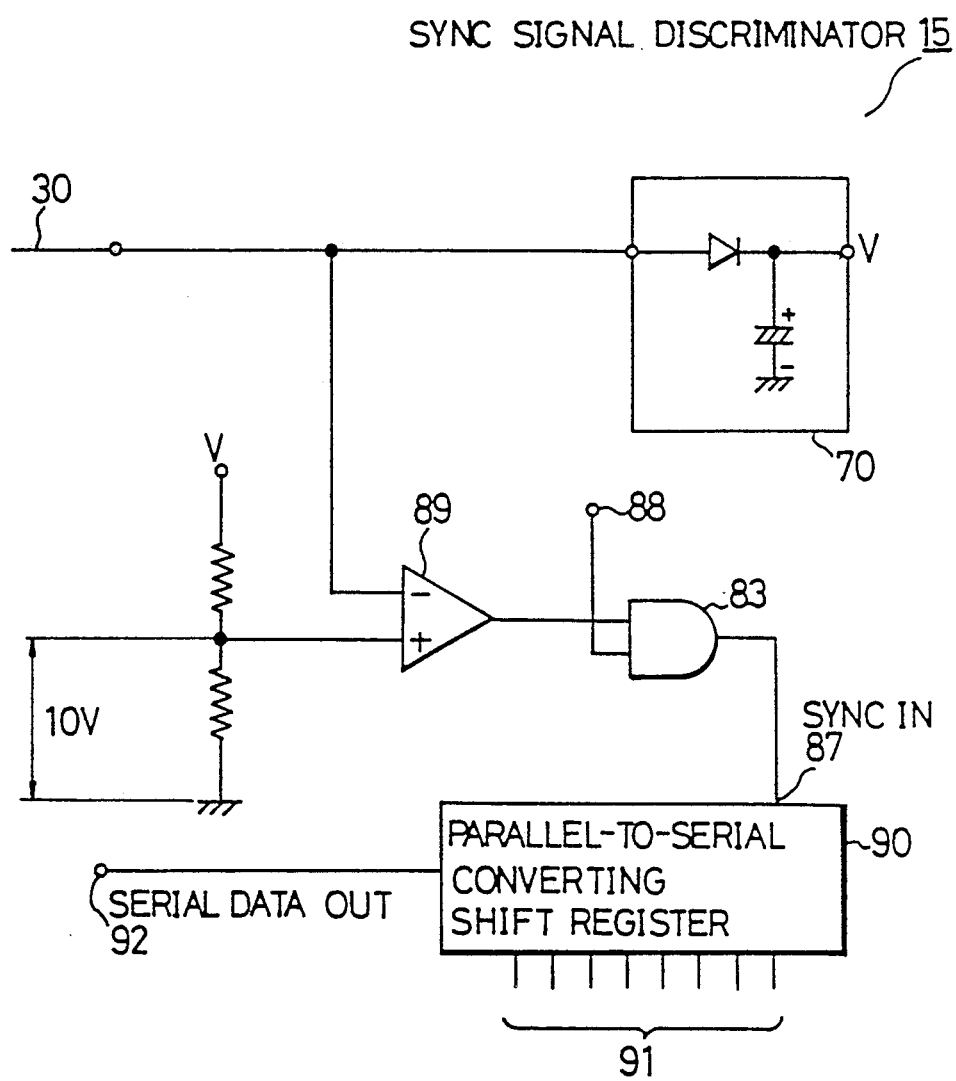

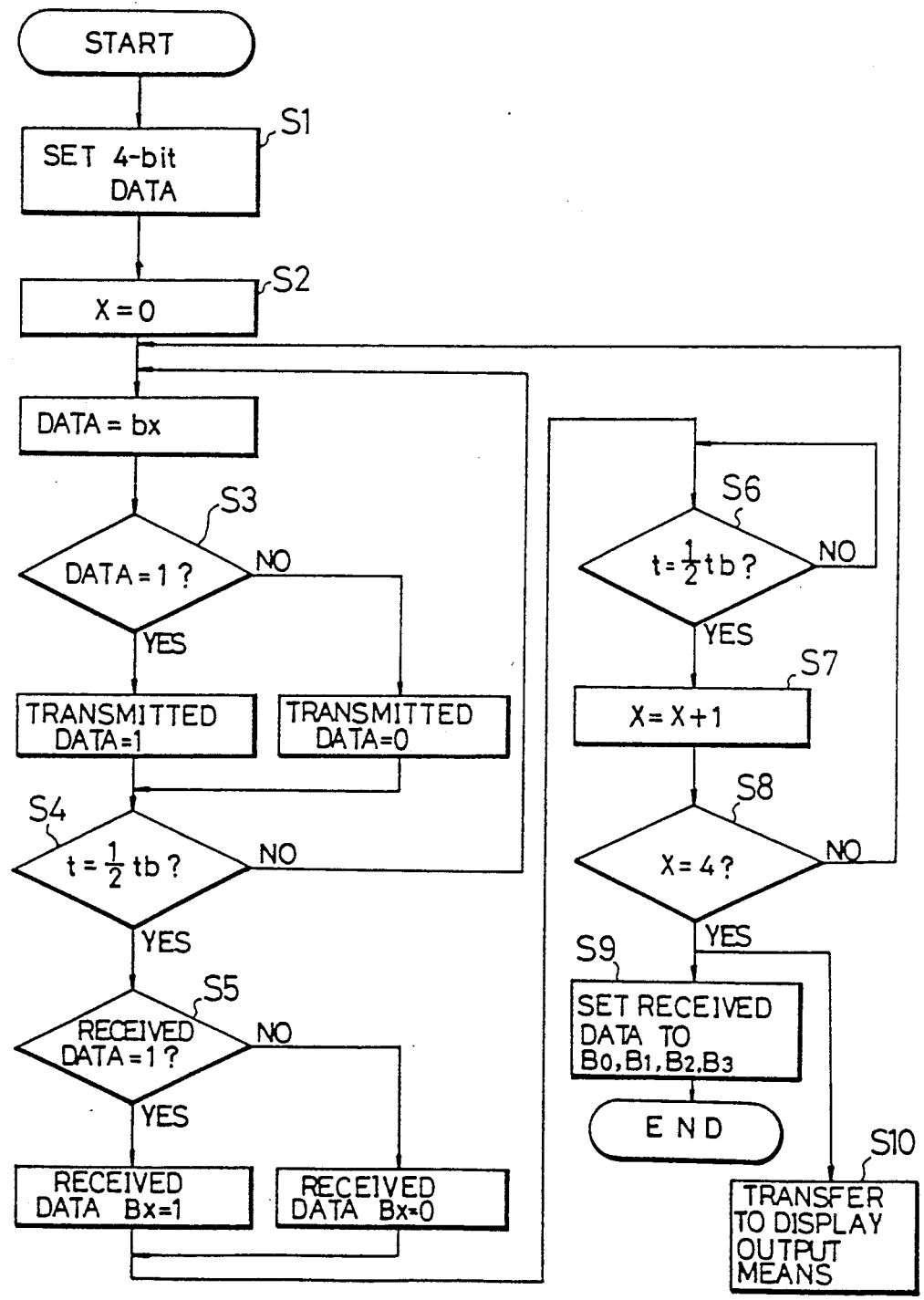

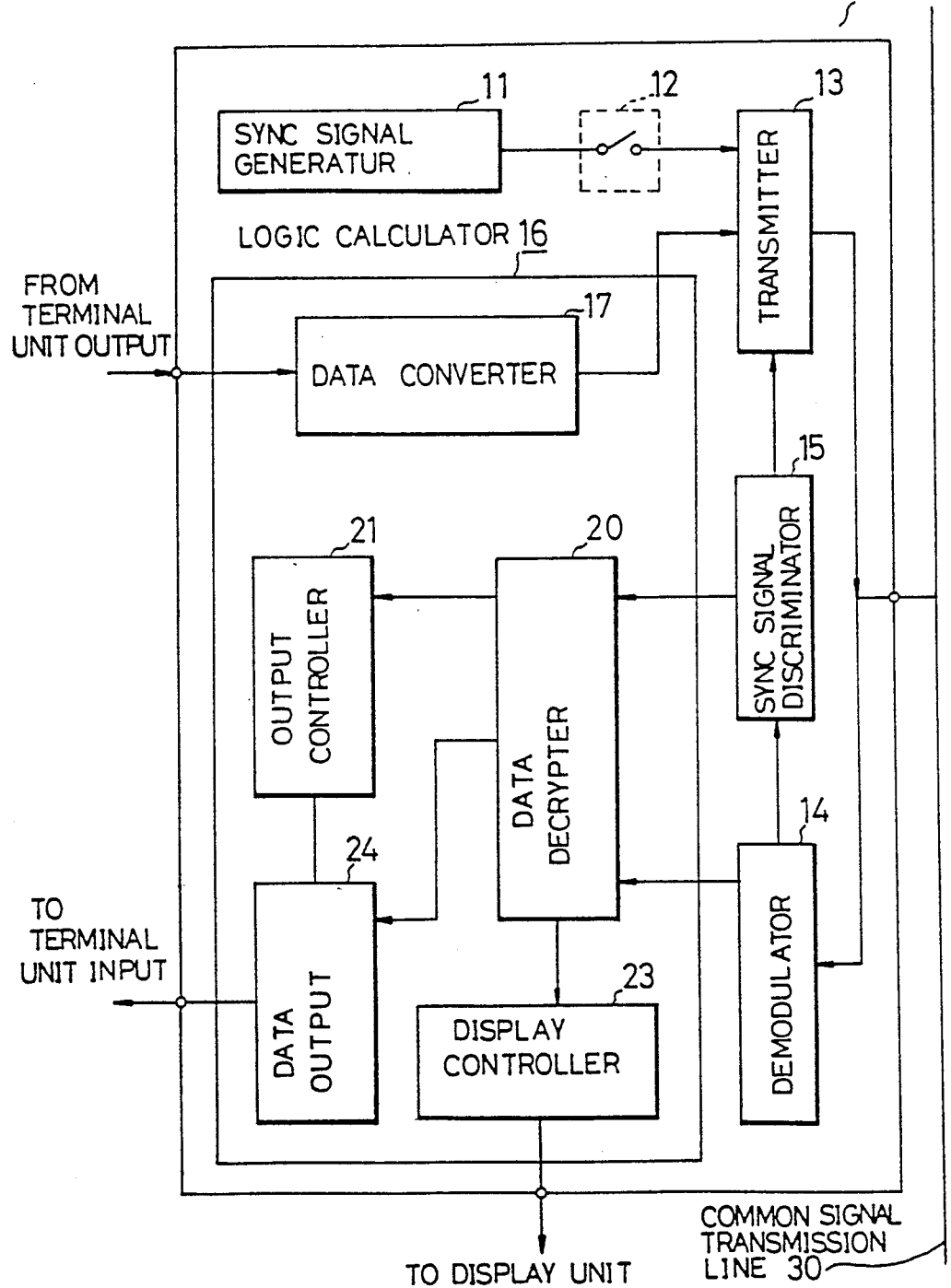

SYNC SIGNAL 50

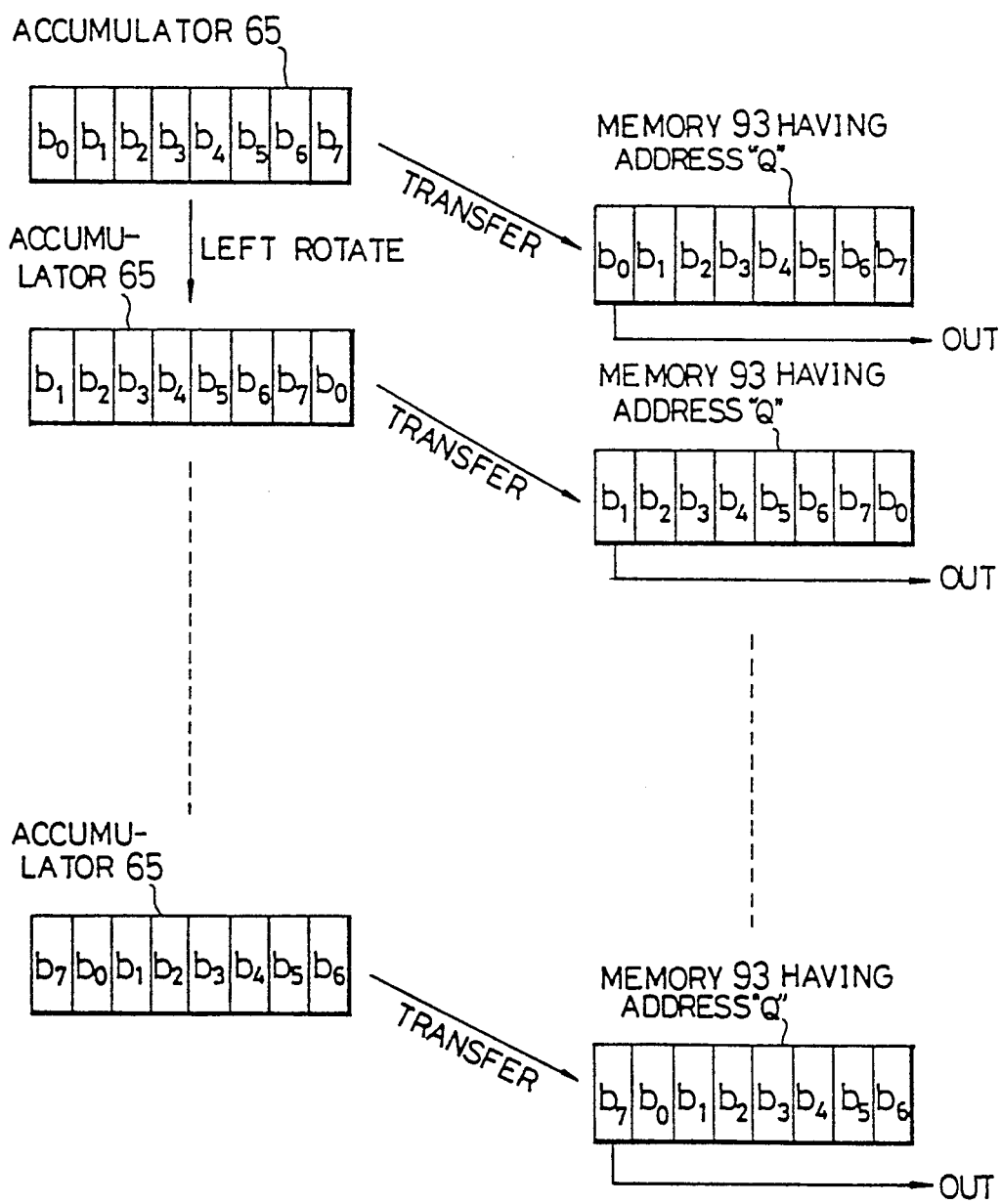

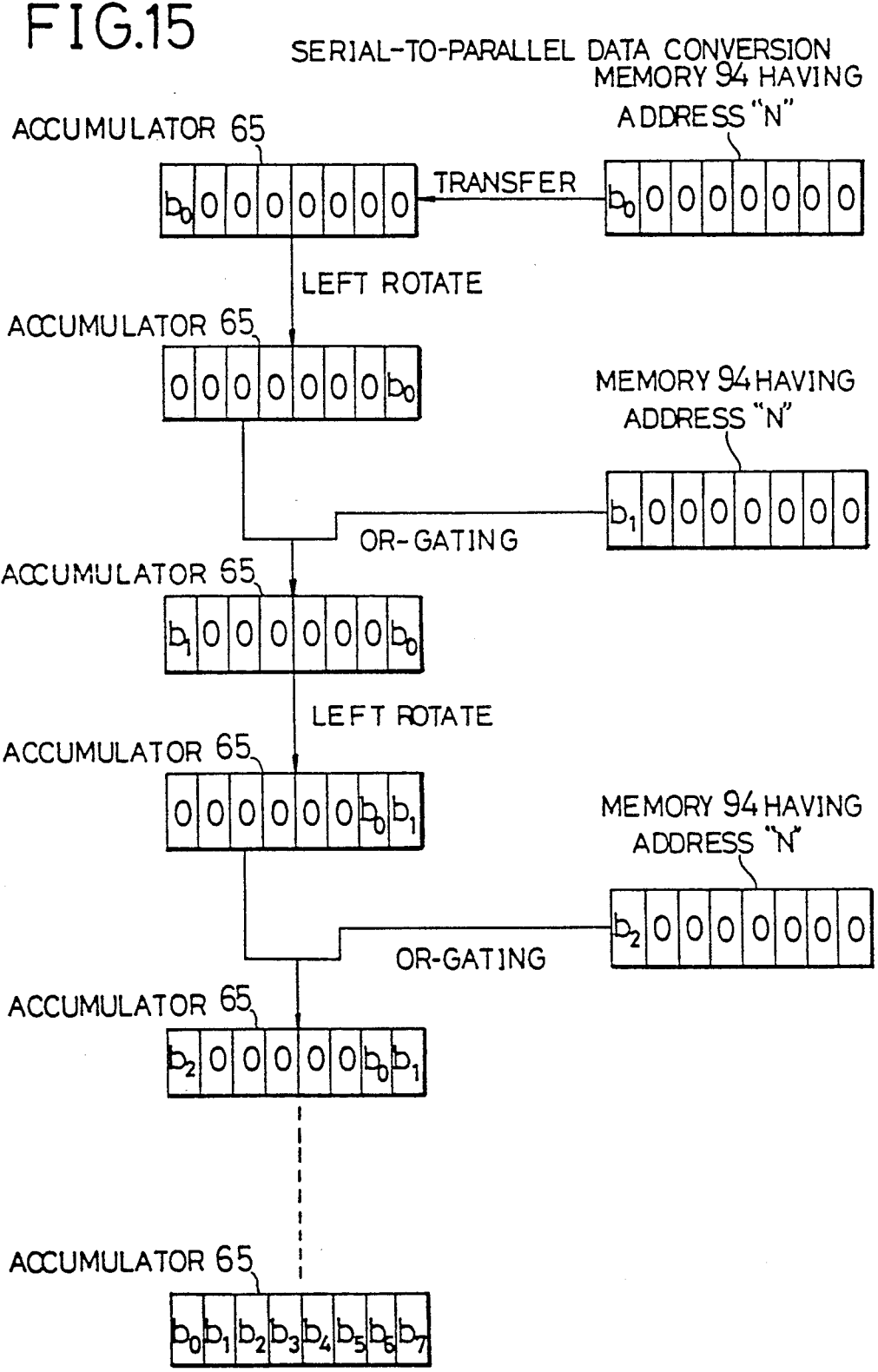

SIMULTANEOUS DATA AND ELECTRIC POWER TRANSMITTING/RECEIVING SYSTEM

BACKGROUND OF THE INVENTION

1. Field of the Invention

The present invention generally relates to a data and electric power transmitting/receiving apparatus used for an automatic control system, e.g., a so-called "home automation system." More specifically, the present invention is directed to a system where simultaneous data and electric power transmission and reception are carried out between a plurality of controllers and terminal devices.

2. Description of the Prior Art

Generally, the so-called "home automation (HA) system" is adapted to home electric appliances as terminal devices, and connects the terminal devices to a plurality of controllers via a common transmission line to establish data communication between the terminal devices and controllers.

Such a HA system for electronically uniting terminal devices such as air conditioners and bath heating systems is disclosed, for instance, in Japanese Patent Publication (examined application) No. 62-142431(1987). According to this conventional HA system, a control signal is transmitted from one controller via a common transmission line to the corresponding terminal device. The control signal contains an address set to one of the terminal devices. In transmitting the control signal, this controller firstly confirms that there is no control signal transmitted from others controllers or terminal devices on the common transmission line. If there are no signals on the common transmission line, this controller sends the control signal to the terminal devices through the common transmission line. Each terminal device receives the control signal only when the address contained in the control signal coincides with an address of the terminal device in question, so that the terminal devices may be controlled independently of each other. Accordingly, operations of the selected terminal devices may be readily controlled in desirable modes, such as starting and stopping operations.

In recent years, the HA systems have remarkably been enhanced as demands for conveniences have increased, and these systems have been utilized with more kinds of electric appliances. As the number of kinds of electric appliances to be controlled by the HA systems increases, it is important to quickly let an operator confirm whether or not the electric appliances are operating according to specified conditions, or whether or not the specified conditions are being maintained safely. Otherwise, the desired convenience may not be realized by the conventional HA systems.

Although the conventional HA systems can freely stop, start or leave unchanged the, operations of the terminal devices, the conventional HA systems have several drawbacks. Namely, operating conditions of one terminal device can be known by receiving a signal indicative of the operating conditions of the terminal device, after confirming that no control signal is being transmitted from the controller or that no signals indicating operating conditions of the remaining terminal devices are present on the transmission line. Therefore, a relatively longer time period is required from sending an operation instruction to one terminal device from the controller until receiving a result from the terminal device at the controller.

In controlling electric appliances by the HA systems, therefore, it is required to improve the communication speed of the HA systems.

According to another conventional HA system, a control unit is connected to various actuators and sensors through a large number of many communication lines, respectively. Therefore, the communication lines form a transmission line network for the system as a whole. Such a network formation requires difficult connection and maintenance works and tends to cause erroneous operation due to line disconnection and external noise.

An object of the present invention is to solve the drawbacks of the conventional systems and provide a data and power transmitting/receiving system to freely stop, start and release operations of selected ones of a plurality of terminal devices and improve a communication speed between a plurality of controllers and the terminal devices.

Another object of the present invention is to provide a data and power transmitting/receiving system causing no erroneous operation due to external noise and line disconnection and make connection and maintenance works easier.

Still another object of the present invention is to provide a data and power transmitting/receiving system using a two-wire communication line to almost simultaneously transmit and receive data as well as electric power between a plurality of terminal devices and controllers. Particularly, the system combines a synchronization signal with a data signal and uses the synchronization signal as electric power to the terminal devices.

SUMMARY OF THE INVENTION

To achieve the above-described objects and other features of the invention, a data and power transmitting-/receiving system comprises:

a plurality of terminal means (20A:20N) to be controlled for producing specific data (40) to the respective terminal means (20A:20N);

a plurality of communication means (10A:10N) connected to the corresponding terminal units (20A:20N), including;

at least a sync signal generator (2A:2N) for generating a sync (50) and superimposing the sync signal (50) on the specific data (40) in a time-division mode to produce a data signal (45), and a data processing unit (4A:4N) for processing the data signal (45) to judge a controlling condition of the respective terminal means (20A:20N) and also to produce power for driving the data processing unit (4A:4N); and, a common signal transmission line (30) for connecting said plurality of communication means (10A:10N) so as to communicate the data signal (45) with the communication means (10A:10N), whereby simultaneous data transmission and reception are carried out between the communication means (10A:10N).

According to the present invention, each of the above-described communication means further includes:

means (11) for generating a sync signal (50) at a predeterminal time interval to determining a starting instance of both data transmission and reception;

means (12) for determining whether or not the sync signal (50) is transmitted prior to the specific data (40);

means (13) for transmitting the specific data (40) and sync signal (50) as the data signal (45) via the common signal transmission line (30) to other communication means;

means (14) for demodulating the data signal (45) received via the signal transmission line (30) from other communication means;

means (15) for discriminating the specific data (45) from the sync signal (50); and;

means (16) connected between the terminal means (20A:20N), transmitting means (13), demodulating means (14), and discriminating means (15), for processing the sync signal (50) and data (40) to control the terminal means (20A:20N), whereby the simultaneous data transmission and reception are carried out between the communication means (10A:10N).

BRIEF DESCRIPTION OF THE DRAWINGS

For a better understanding of the present invention, reference is made to the following descriptions in conjunction with the accompanying drawings, in which:

FIGS. 1A to 1C are schematic illustrations for explaining a basic idea of a data and power transmitting/receiving system 100 according to the invention;

FIGS. 4A to 4C are circuit diagrams employed in the system 200;

FIG. 5 is a flowchart for explaining the overall operation of the system 200;

FIG. 6 is a block diagram of the communication unit 10A employed in the system 200;

FIGS. 14 and 15 schematically illustrate data conversion methods employed in the system 300;

DETAILED DESCRIPTION OF THE PREFERRED EMBODIMENTS

Before proceeding with various types of preferred embodiments of the invention, a basic idea of a data and power transmitting/receiving system according to the invention will now be described.

Figure 1B:
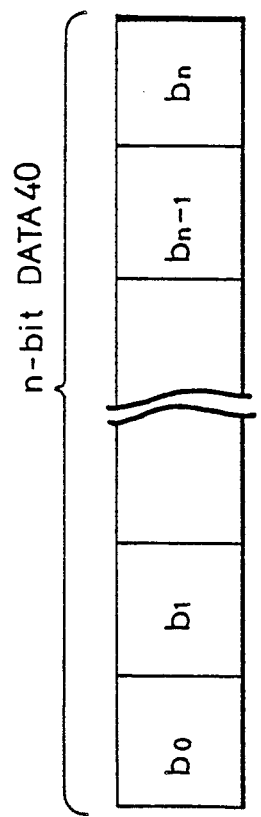
Figure 1C:
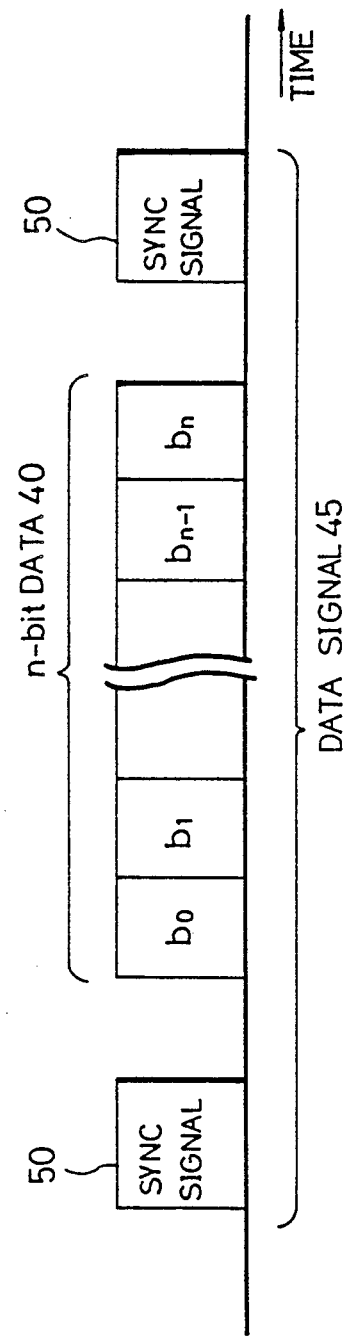

FIG. 1A is a schematic diagram of an entire system according to a basic idea of the invention. FIG. 1B schematically illustrates an n-bit data used in this system. FIG. 1C schematically illustrates a communication signal containing the n-bit data and synchronization (sync) signal.

In the data and power transmitting/receiving system 100 of the invention shown in FIG. 1A, a plurality of communication units 10A, 10B, ..., 10N are connected via a single common signal transmission line (signal bus) 30 to terminal units 20A to 20N, respectively. Data 40 shown in FIG. 1B is transmitted through the transmission line 30. As shown in FIG. 1B the figure, the data 40 comprises binary data $b_0, b_1, \ldots, b_n$ each representing one or the other of two values. The bits of the data 40 correspond to functions of the terminal units 20A to 20N, respectively. For example, a determination is made that a HIGH level in the two values of one bit activates a function of one terminal unit and a LOW level stops the same function. As shown in FIG. 1C, a sync signal 50 is combined with the data 40 in time sequence. Even if all the communication units 10A to 10N simultaneously transmit and receive signals, the respective communication units can identify which of the signals operates which of the terminal units 20A to 20N, or which of the terminal units 20A to 20N is operating.

In other words, the sync signal 50 is generated by sync generators 2A to 2N employed in the respective communication units 10A to 10N and added to the data 40 at a predetermined timing. The data 40 combined with the sync signal 50 is processed by data processing units 4A to 4N employed in the communication units 10A to 10N, respectively, to identify or discriminate controlling conditions of the terminal units 20A to 20N from each other.

As previously described, the data and power transmitting/receiving system of the invention includes a plurality of communication units and a single common transmission line to freely interrupt, start and release operations of selected one of a plurality of terminal units, thereby improving communication speed between the communication units and terminal units.

Circuit Arrangement of First Data and Power Transmitting/Receiving System 200

A data and power transmitting/receiving system 200 according to a first embodiment of the invention will be described. The system 200 is arranged based on the basic idea explained before.

Figure 2:
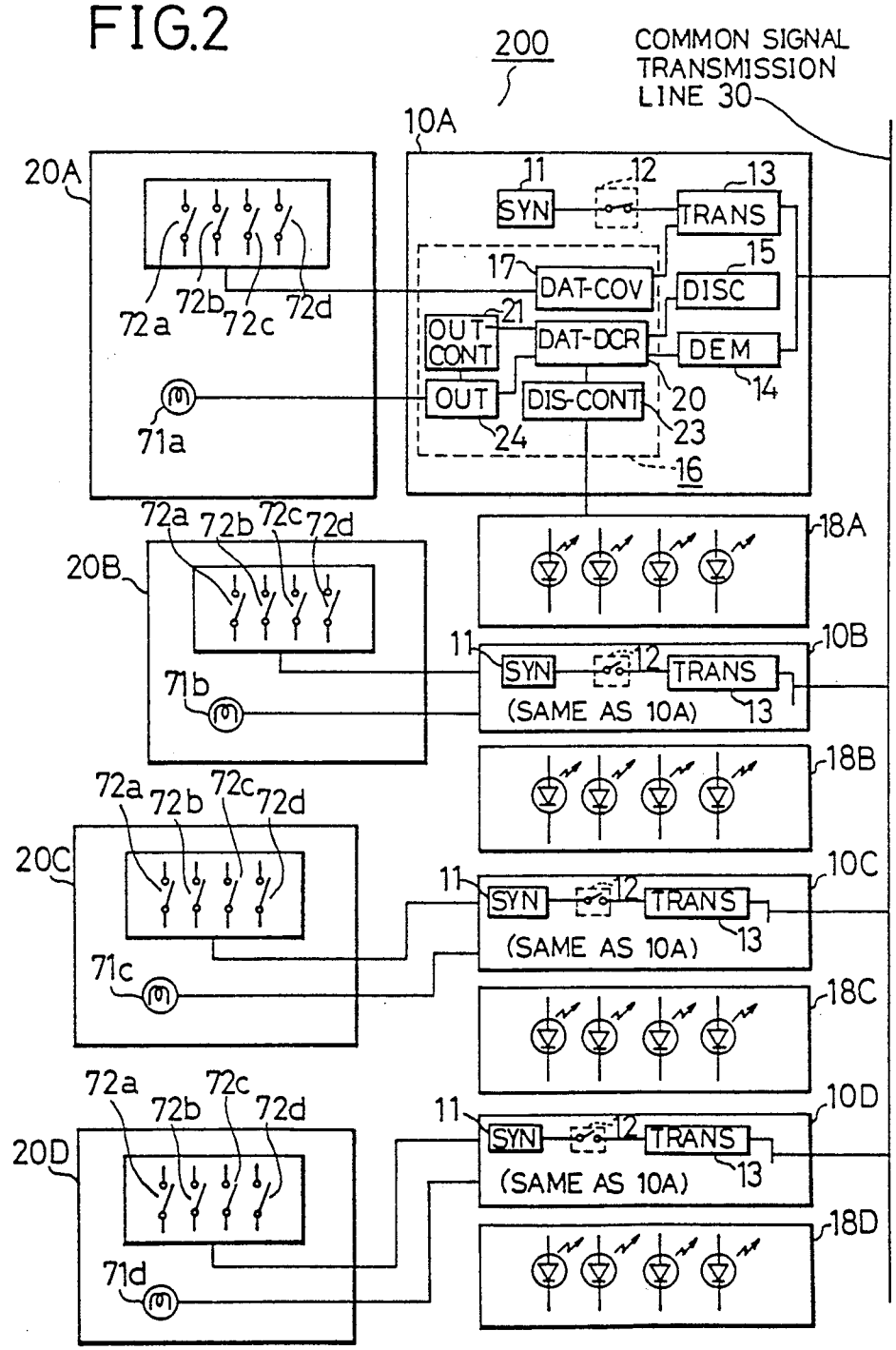
FIG. 2 is a schematic block diagram of a data and power transmitting/receiving system 200 according to a first preferred embodiment of the invention.

FIG. 2 is a block diagram showing the entire system 200. In FIG. 2, like parts shown in FIG. 1 are represented with like reference numerals.

The system 200 includes four communication units 10A, 10B, 10C and 10D. In the communication unit 10A, a sync signal generator 11 periodically generates a sync signal 50 at a predetermined time interval. The sync signal 50 determines commencement of signal transmission and reception. The sync signal generator 11 produces the sync signal by dividing a frequency of clock signals supplied from a logic calculator 16, and generates the sync signal 50. The logic calculator 16 is a microcomputer. All the communication units 10A to 10D simultaneously transmit and receive signals in response to the sync signal 50.

Figure 3:
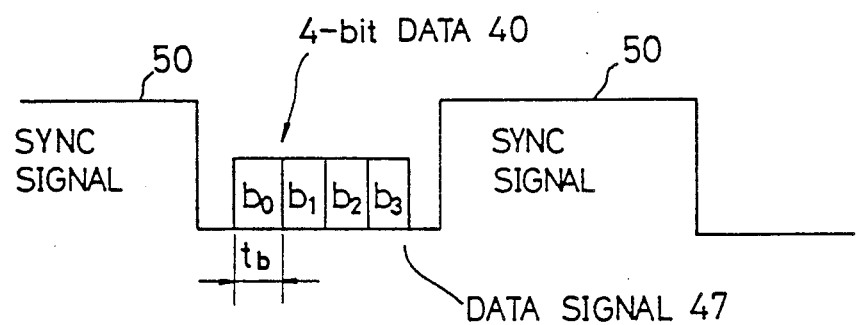
FIG. 3 is a waveform of the signal communicated in the data and power transmitting/receiving system 200 shown in FIG. 2.

As shown in FIG. 3, communication data 40 comprises four bits $b_0, b_1, b_2$ and $b_3$ following the sync signal 50. The first bit $b_0$ represents a function of turning ON and OFF a lamp 71a connected to the terminal unit 20A. The terminal unit 20A is connected to the communication unit 10A. The second bit $b_1$, third bit $b_2$ and fourth bit $b_3$ represent functions of turning ON and OFF lamps $71b$, $71c$ and $71d$, respectively. In this way, the data 40 represents and identifies the destinations and contents of communication.

Each of the communication units 10A to 10D has the sync signal generator 11 to generate the sync signal 50 to determine commencement of signal transmission and reception.

A switching means 12 determines whether or not the sync signal of each sync signal generator 11 will be transmitted before the data 40. The switching means 12 of the communication unit 10A is set to be ON, and the switching means 12 of the other communication units 10B to 10D are set to be OFF in the first preferred embodiment.

Figure 4A:
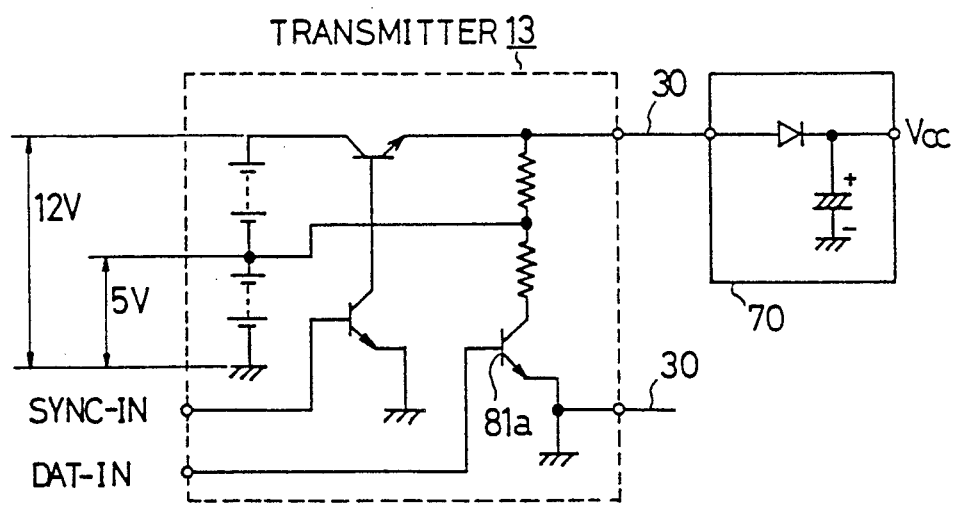

A transmitter 13 shown in FIG. 4A receives the communication data 40 from the logic calculator 16 and transmits the data 40 to the common transmission line 30 only after receiving the sync signal 50.

Figure 4B:
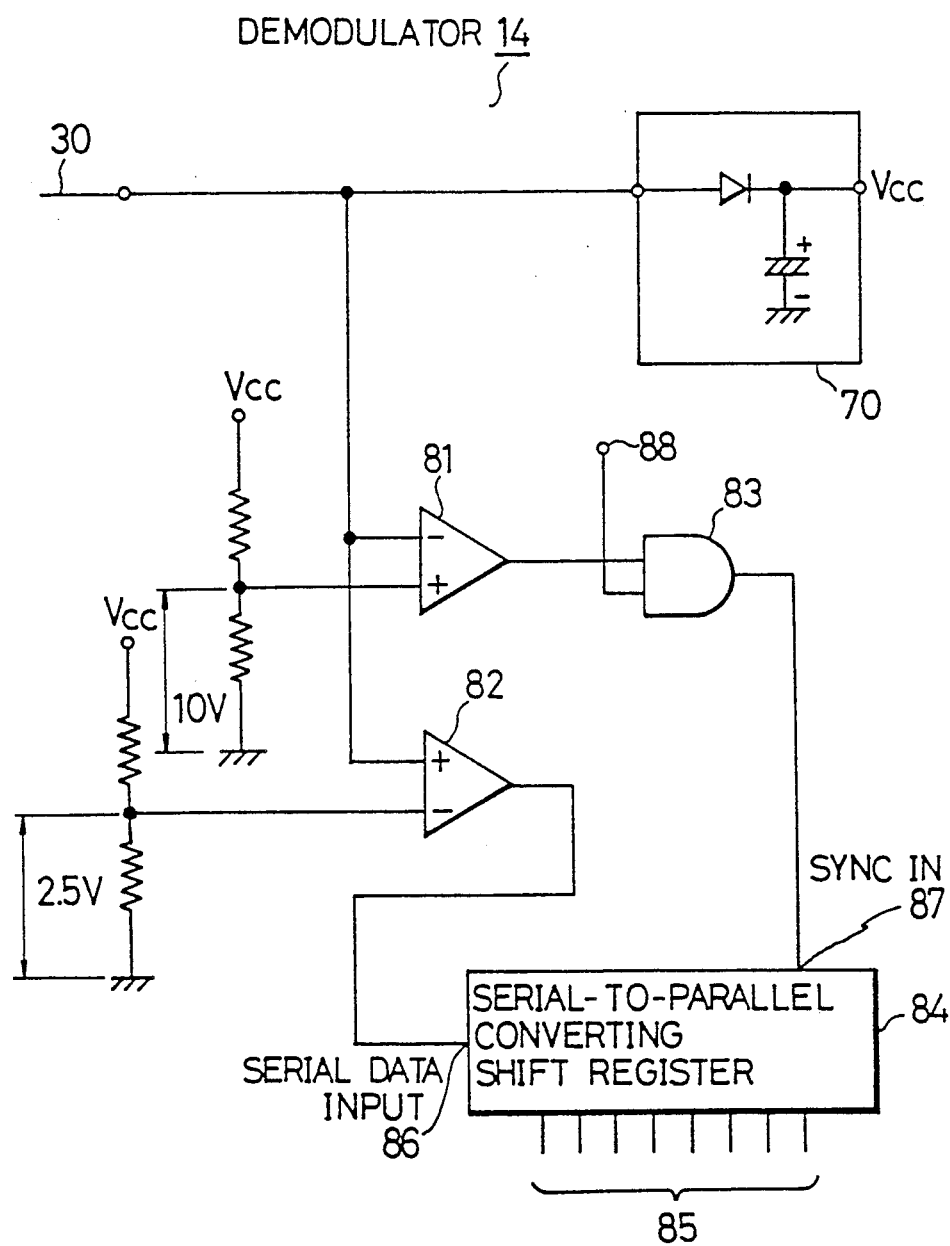

A demodulator 14 shown in FIG. 4B demodulates the communication data 40 transmitted through the transmission line 30 from the transmitter 13.

A sync signal discriminator 15 shown in FIG. 4C discriminates the communication data 40 from the sync signal 50.

A data converter 17 connects the terminal unit 20A (20B, 20C or 20D) to the transmitter 13 and converts the data from the terminal unit 20A into discriminable data. With the data converter 17, the lamps $71a$, $71b$, $71c$ and $71d$ are turned ON and OFF according to instructions given by switches $72a$, $72b$, $72c$ and $72d$ of the terminal unit 20A (20B, 20C or 20D). They are applied with a power source voltage Vcc and connected to a data line of the terminal unit connected to the logic calculator 16.

The logic calculator 16 includes a data decrypter 20, an output controller 21 and a data output 24. The data decrypter 20 decrypts the communication data demodulated by the demodulator 14. The output controller 21 determines, according to an output of the data decrypter 20, whether or not an output should be given to the terminal unit. The data output 24 outputs the data to the terminal unit only when the output controller determines to give the data to the terminal unit. The logic calculator 16 is operated under the control of the microcomputer.

Operation of System 200

Operation of the system 200 will now be described in connection with turning ON and OFF the lamps $71a$ to $71d$ from four remote locations.

In the communication unit 10A, the switch $72a$ of the terminal unit 20A may be pushed to generate a signal. A first bit $b_0$ of the signal is set to "1" in the communication unit 10A, and a digital signal of "1, 0, 0, 0" is sent to the transmitter 13 (See FIG. 2) after the sync signal 50. The signal is applied to a base terminal of a transistor $81a$ (See FIG. 4A) to produce a signal of "0, Vcc, Vcc, Vcc" from a collector terminal of the transistor $81a$. The signal then appears on the transmission line 30.

If no switches are pushed in the remaining communication units 10B to 10D, these communication units 10B to 10D transmit signals each of "Vcc, Vcc, Vcc, Vcc" to the transmission line 30 after the sync signal 50. At this time, the transistor $81a$ of the communication unit 10A becomes conductive between the collector and emitter. Therefore, the signal of "0, Vcc, Vcc, Vcc" will appear on the transmission line 30. However, if other switches $72b$ to $72d$ were pushed at the moment, bits of the data corresponding to the pushed switches are each "0" on the transmission line 30.

Each of the demodulators 14 connected to the transmission line 30 demodulates the signal on the transmission line, and provides the signal of "1, 0, 0, 0," if only the switch $72a$ has been pushed, to the data decrypter 20.

Each of the output controllers 21 determines, according to an output of the data decrypter 20, whether or not an output will be given to the terminal unit 20A (20B, 20C or 20D). In the communication unit 10A, therefore, the output controller 21 determines to supply an output to the terminal unit 20A. However, the output controllers 21 of the other communication units 10B to 10D determine not to give outputs to the terminal units 20B to 20D. Therefore, only the data output 24 of the communication unit 10A outputs the data to the terminal unit 20A. As a result, only the lamp $71a$ is lighted up.

The display units 18A to 18D turn on LEDs, if the data bits from the data decrypter 20 corresponding to the LEDs are "1." Therefore, at any of the communication units 10A to 10D, it is possible to judge which of the lamps $71a$ to $71d$ are illuminated.

A sequence of the operations described above will briefly be explained with reference to a flowchart of FIG. 5.

Firstly, 4-bit data is set to initialize a transmission data memory (Step S1). A first bit of the transmission data is designated (Step S2). The transmission data is converted (Step S3). This conversion is needed to match the data with a wired-OR gating operation of the transmission line.

It is checked to see whether or not an interval of $\frac{1}{2}$-bit data has elapsed in response to clock signals (Step S4). Then, reception data is demodulated to decrypt this data (Step S5).

A check is made to see whether or not an interval of one bit data has elapsed in response to clock signals (Step S6).

Then, the next bit is prepared (Step S7).

Another check is made to see whether or not the 4-bit data has been obtained (Step S8).

In the last step, the reception data is set to "$B_0$, $B_1$, $B_2$, $B_3$" (Step S9) and transferred to the display controller (Step S10).

With the series of operations, data processing is completed.

Detailed Circuit Arrangement of Communication Unit

A circuit arrangement of the communication unit 10A of the system 200 according to the first embodiment will be described in detail with reference to FIG. 6.

The sync signal generator 11 periodically generates the sync signal 50 at a predetermined time interval. The sync signal 50 determines a transmission start timing of the data signal 40. The sync signal generator 11 may be formed of a frequency dividing circuit composed of logic gates and a generally known oscillator circuit. If a microcomputer is employed, reference clock signals of the microcomputer may be used with the combination of hardware logic gates to form the frequency dividing circuit as of the sync signal generator 11. Alternatively, software of the microcomputer may establish the same function of the frequency dividing circuit.

Figure 7:
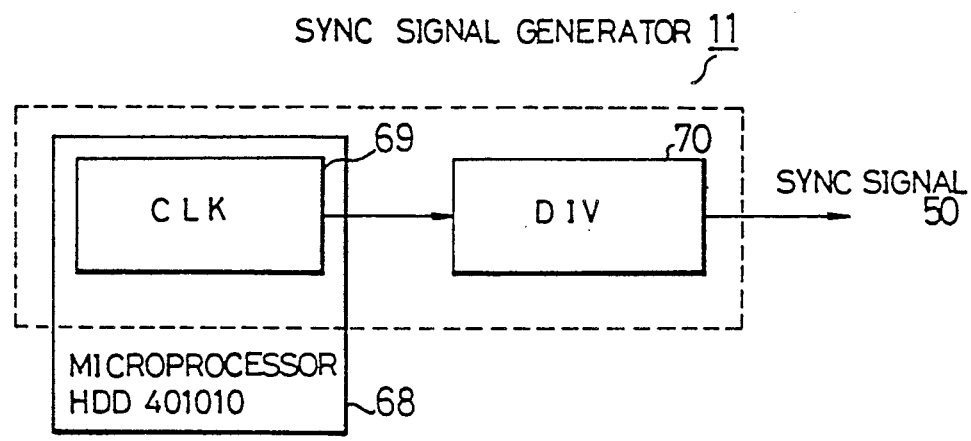
FIG. 7 is a block diagram of the sync signal generator 11 employed in the system 200.

For example, a clock circuit 69 of a single-chip microprocessor 68 provides clock pulses, and the frequency of the clock pulses is divided by a frequency dividing circuit 70 to obtain the sync signal 50, as shown in FIG. 7.

To discriminate the sync signal 50 from the communication data 40, the sync signal 50 will be changed to a signal having a level different from that of the communication data 40, or the sync signal 50 will be converted into a special code. Also, the sync signal 50 may be modulated in the different way from the communication data.

A switching means 12 determines whether or not the sync signal 50 from the sync signal generator 11 is transmitted before the communication data 40. The switching means 12 may be realized by any device functioning as a switch. The switching means 12 is closed if the communication unit 10 including the switching means 12 in question is used as a communication controller among a plurality of the communication units 10 connected to the single common transmission line 30. The switching means 12 of the remaining communication units 10 are not closed. Any other disconnecting means may be used as the switching means 12.

A transmitter means 13 transmits the communication data 40 sent from the logic calculator 16 to the transmission line 30 only after receiving the sync signal 50. The transmitter means 13 comprises a parallel-to-serial converter for temporarily storing the communication data 40 and outputting the communication data 40 in time sequence, or division in response to an input of the sync signal 50. The transmitter means 13 may include either a circuit for handling an output of the parallel-to-serial converter as it is as a voltage signal, or a circuit for converting the output of the parallel-to-serial converter into a tone burst wave. Alternatively, the logic calculator 16 may incorporate a program for temporarily storing the communication data 40 and outputting the communication data 40 in time sequence, or division after the sync signal 50. The circuits and programs materializing the transmitter 13 are not particularly limited but any ones currently used may be employed.

A demodulator means 14 demodulates the communication data 40 transmitted through the transmission line 30. The demodulator means 14 may be realized by a circuit for demodulating the signal or the tone burst wave sent from the transmitter means 13. Alternatively, the demodulator means 14 may be realized by a circuit which uses the voltage signal from the transmitter 13 as is. The demodulator means 14 further includes a serial-to-parallel converter. The serial-to-parallel converter converts the communication data 40 demodulated by the demodulating circuit, into parallel data and temporarily stores the resultant parallel data. The parallel data is easily processed. Alternatively, the logic calculator 16 may incorporate a program to convert the time-sequence communication data 40 demodulated by the demodulating circuit, into the parallel data and temporarily store the parallel data. The circuits and programs materializing the demodulator 14 are not particularly limited but any ones currently used may be employed.

Figure 8A:
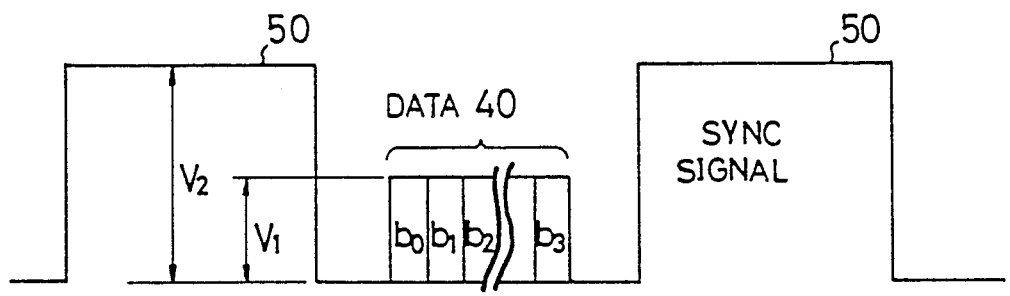
FIGS. 8A and 8B are waveforms of the modified signal used in the system 200.
Figure 8B:
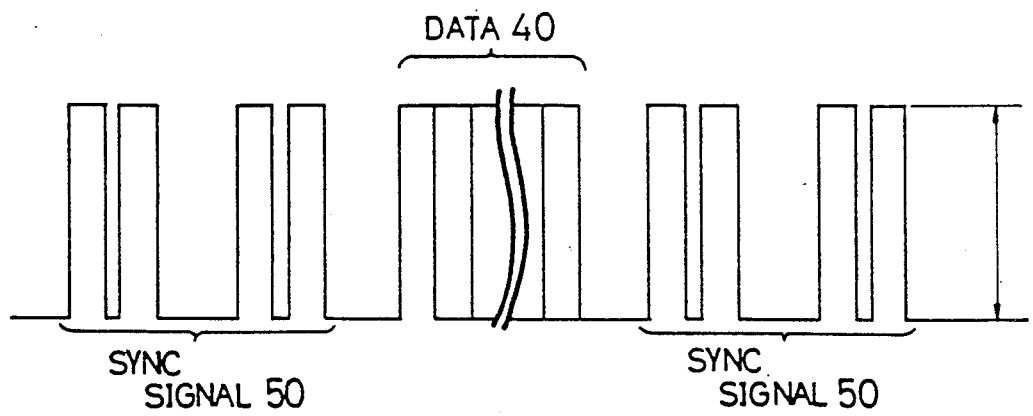

A sync signal discriminator means 15 discriminates the communication data 40 from the sync signal 50. If the sync signal 50 and communication data 40 have different levels respectively, the sync signal discriminator 15 will have a comparator as shown in FIG. 8A. The comparator compares the levels of the sync signal 50 and communication data 40 with reference levels. The reference levels correspond to threshold levels of the sync signal 50 and communication data 40. If the sync signal 50 and communication data 40 have the save level but the sync signal is represented with a specific code as shown in FIG. 8B, the sync signal discriminator 15 will be a circuit for decrypting the specific code or will be a code decrypting program provided in the logic calculator 16. If the sync signal 50 is modulated differently from the communication data 40, the sync signal discriminator 15 will be a circuit for demodulating only the sync signal 50.

As previously described, each of the communication units 10A to 10D of the first preferred embodiment mainly comprises the sync signal generator means 11, switching means 12, transmitter means 13, demodulator means 14, sync signal discriminator means 15 and logic calculator means 16. Generally, the logic calculator 16 is a combination of logic elements, or a microcomputer circuit incorporating software.

The logic calculator means 16 includes the data converter means 17, data decrypter means 20, output controller means 21, display controller means 23 and data output means 24 for a terminal unit.

The data converter means 17 connects the terminal unit to the transmitter means 13. The terminal unit transmits the data 40 to the data converter 17. The data 40 specifies the destinations and contents of communication. The data converter means 17 converts the data 40 into identifiable data. The terminal unit may have many switches such as keys of a keyboard. The data converter 17 may be realized by a combination of predetermined logic gates incorporated in the logic calculator means 16, or by a program for carrying out data conversion according to a predetermined format.

A data decrypter means 20 decrypts the data 40 sent from the data converter means 17. The data decrypter means 20 may be realized by a combination of predetermined logic gates incorporated in the logic calculator means 16, or by a program for carrying out data decryption according to a predetermined format.

A display controller means 23 outputs the communication data 40 from the data decrypter 20 to the display unit for displaying the communication data 40. The display controller means 23 may be realized by a combination of predetermined logic gates incorporated in the logic calculator 16 or by a program for carrying out data conversion according to a predetermined format. If the display unit uses LEDs (light emitting diodes), etc., operated by electric current, there is provided a latch circuit for holding the data 40 until the next data 40 is received, and a current amplifier for displaying the data held in the latch circuit on the LEDs. If the display unit is connectable to the microcomputer, there are provided an interface and a program. The program is for controlling data to be outputted via the interface.

An output controller means 21 determines, according to the data 40 from the data decrypter 20, whether or not the data will be given to the terminal unit. 0000 The data output 24 outputs the communication data 40 from the data decrypter 20 to the terminal unit only when the output controller 21 operates to provide the data to the terminal unit. The output controller 21 and data output 24 may be realized by the combination of predetermined logical gates incorporated in the logic calculator 16, or by a program for carrying out conversion according to a predetermined format.

Second Data and Power Transmitting/Receiving System 300

A data and power transmitting/receiving system 300 according to a second embodiment will be described. The system 300 employs a circuit arrangement similar to that of the system 200 according to the first preferred embodiment shown in FIG. 2. Therefore, only a circuit different from the circuit arrangement of the system 200 will be described.

Figure 9:
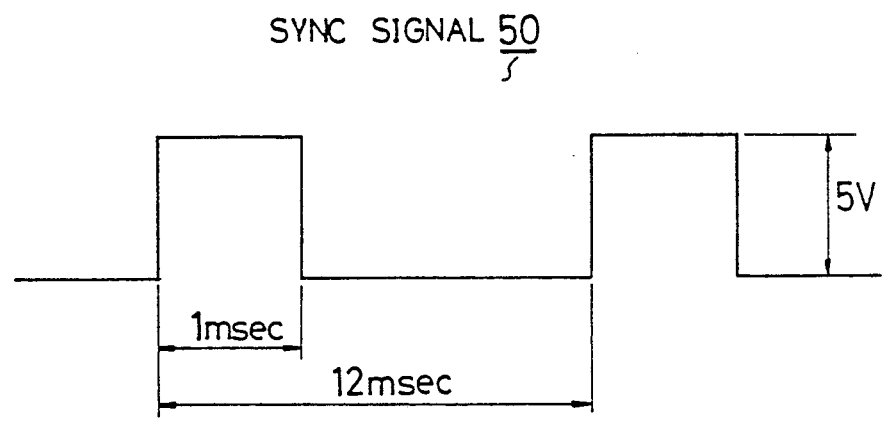
FIGS. 9 to 13C schematically illustrate a waveform of a sync signal and circuits employed in a data and power transmitting/receiving system 300 according to a second preferred embodiment.

A sync signal generator 11 periodically generates a sync signal 50 with a predetermined time interval. The sync signal 50 determines commencement of transmission of a data signal 40. The sync signal generator 11 receives clock signals from a clock signal circuit 69 of a single-chip microcomputer HDD401010 (a trade-name of Hitachi Ltd.,) and divides the frequency of the clock signals by using a frequency dividing circuit shown in FIG. 7 employed therein so as to produce the sync signal 50. As shown in FIG. 9, the sync signal 50 has a duration time of 1 msec and a time period of 12 msec.

Figure 10:
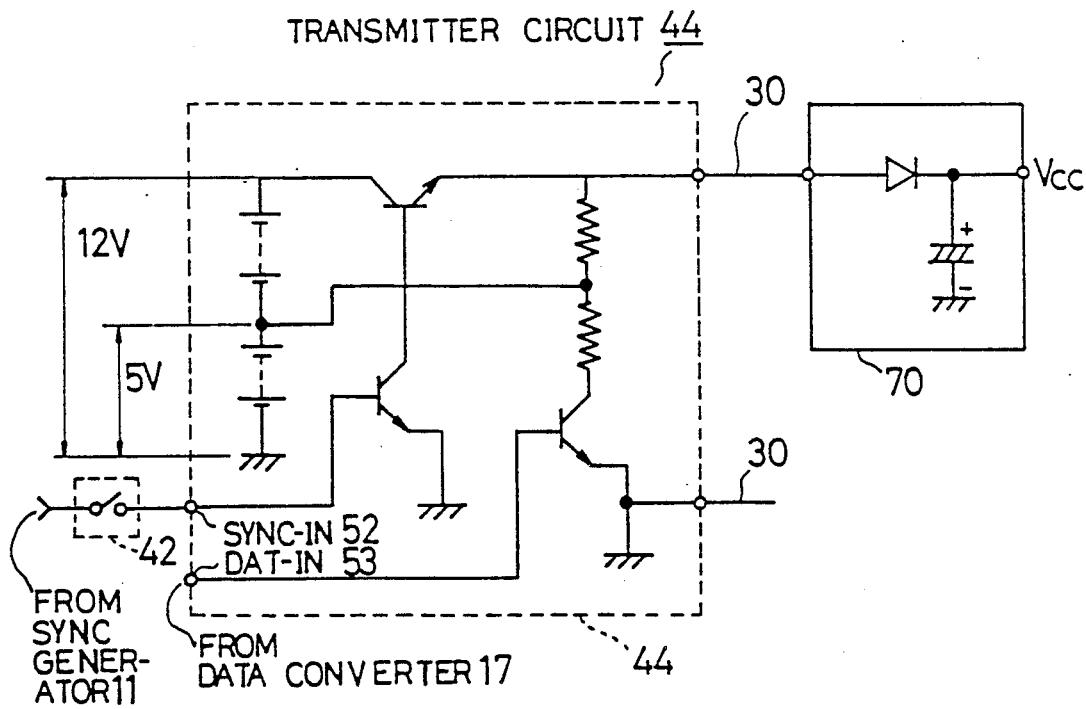

A snap switch 42 determines whether or not the sync signal 50 will be transmitted before the communication data 40. The snap switch 42 is connected to an output of the sync signal generator 11. As shown in FIG. 10, the snap switch 42 is connected between the sync signal generator 11 and an input terminal 52 of a transmitter 44. Only when the communication unit is used as a communication controller of the system 300 is the snap switch 42 closed. The sync signal 50 is transmitted from the communication unit acting as the controller to the remaining communication units (not shown) through a transmission line 30. The transmitters, demodulators and sync signal discriminators employed in the remaining communication units, rectify and smooth the sync signal 50 to obtain the rectified and smoothed signal to power sources 70 of the remaining communication units as shown in FIG. 10.

If the communication unit is not used as the communication controller, the sync signal discriminator provides the sync signal 50 to determine transmission and reception timings.

The transmitter circuit 44 (See FIG. 10) transmits the transmission data only after receiving the sync signal 50. Similar to the sync signal discriminator 15 shown in FIG. 4C, a user work area of a memory of the single-chip microcomputer is used to temporarily store the transmission data. An output terminal of the memory is connected to a parallel signal input terminal of a parallel-to-serial conversion shift register 90. The parallel-to-serial conversion shift register 90 starts to carry out the conversion at a falling edge of the sync signal. An output of the parallel-to-serial conversion shift register 90 is connected to a data input terminal 53 of the transmitter circuit 44 shown in FIG. 10.

Figure 11:
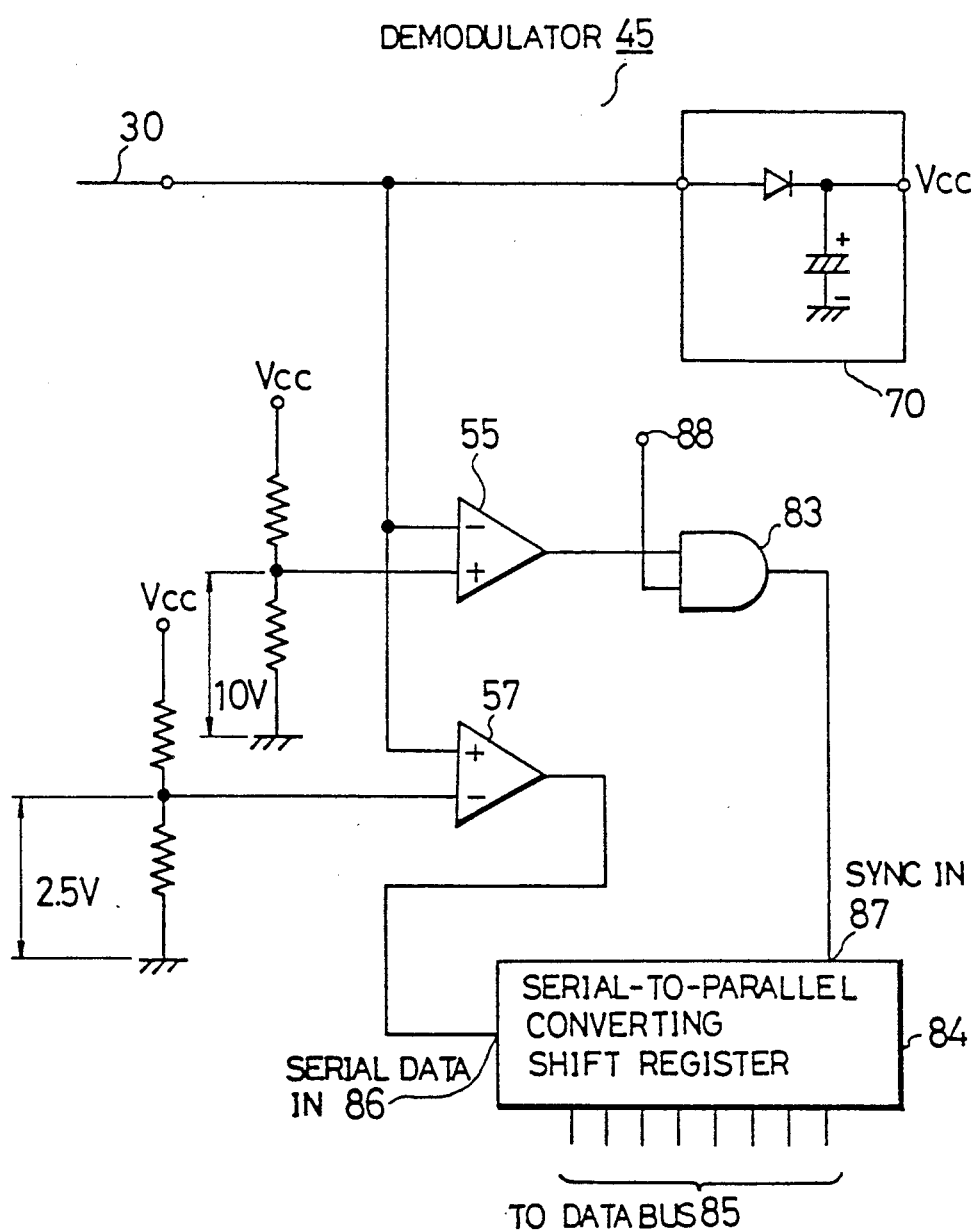

A demodulator 45 shown in FIG. 11 demodulates the communication data 40 transmitted through the transmission line 30. The demodulator 45 corresponds to the demodulator 14 shown in FIG. 2. The demodulator 45 comprises a comparator 55. An inverting input terminal of the comparator 55 is connected to the transmission line 30. The comparator 55 discriminates the sync signal 50 from the communication data 40. The demodulator 45 further comprises a comparator 57. By detecting a falling edge of the discriminated sync signal 50, the communication data 40 following the sync signal 50 is passed through the comparator 57. A reference voltage of the comparator 57 is 2.5 V. Then, the communication data 40 is converted from the time-sequence data into parallel data which is easy to be processed, and temporarily stored in a serial-to-parallel conversion shift register 84. After the storage of the communication data 40 and the detection of a rising edge of the sync signal 50, the communication data 40 is transferred to and stored in an area that is different from the area for storing the transmission data in the single-chip microcomputer.

The logic calculator 16 (See FIG. 2) is realized by a single-chip microcomputer HD401010 (a trade-name of Hitachi Ltd.) The microcomputer is capable of parallel-processing of eight bits data.

Figure 12:
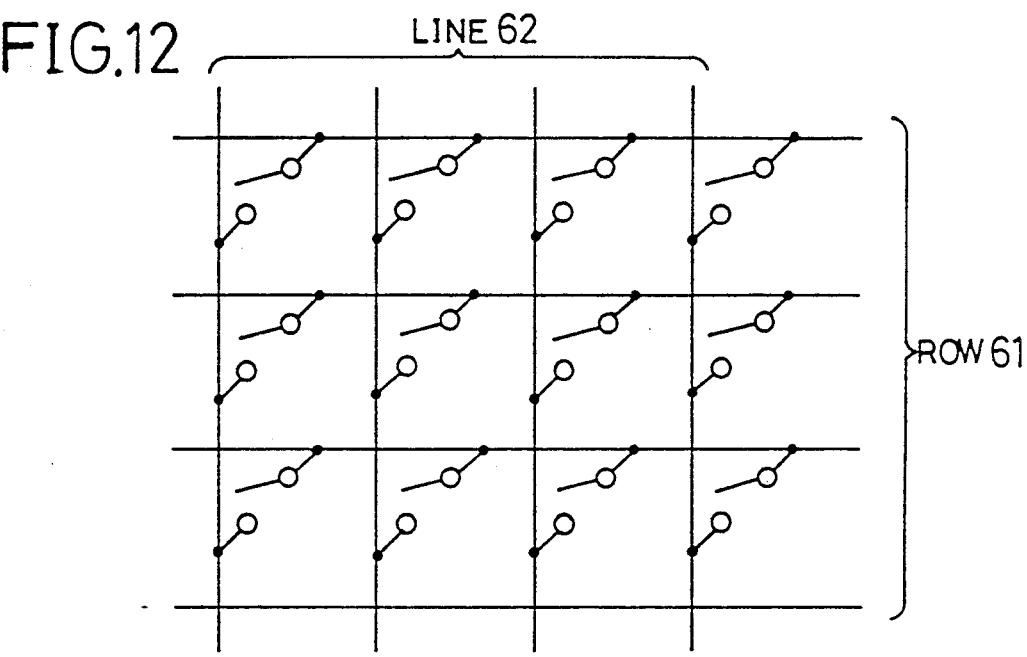

A controller of the preferred embodiment is provided with many switches such as keys of a keyboard. As shown in FIG. 12, the switches are arranged in a matrix form. An address selector is connected to the matrix such that the address selector can select a single address with respect to one of rows 61. Addresses of the rows 61 are sequentially scanned according to a program. If a switch is depressed, an output appears on a corresponding line among lines 62. The signal of the line 62 in question is transferred to a memory in the microcomputer. A program in the microcomputer changes only a bit corresponding to a function of the terminal unit to be controlled to have a state different from those of the other bit to form the transmission data 40.

Figure 13A:
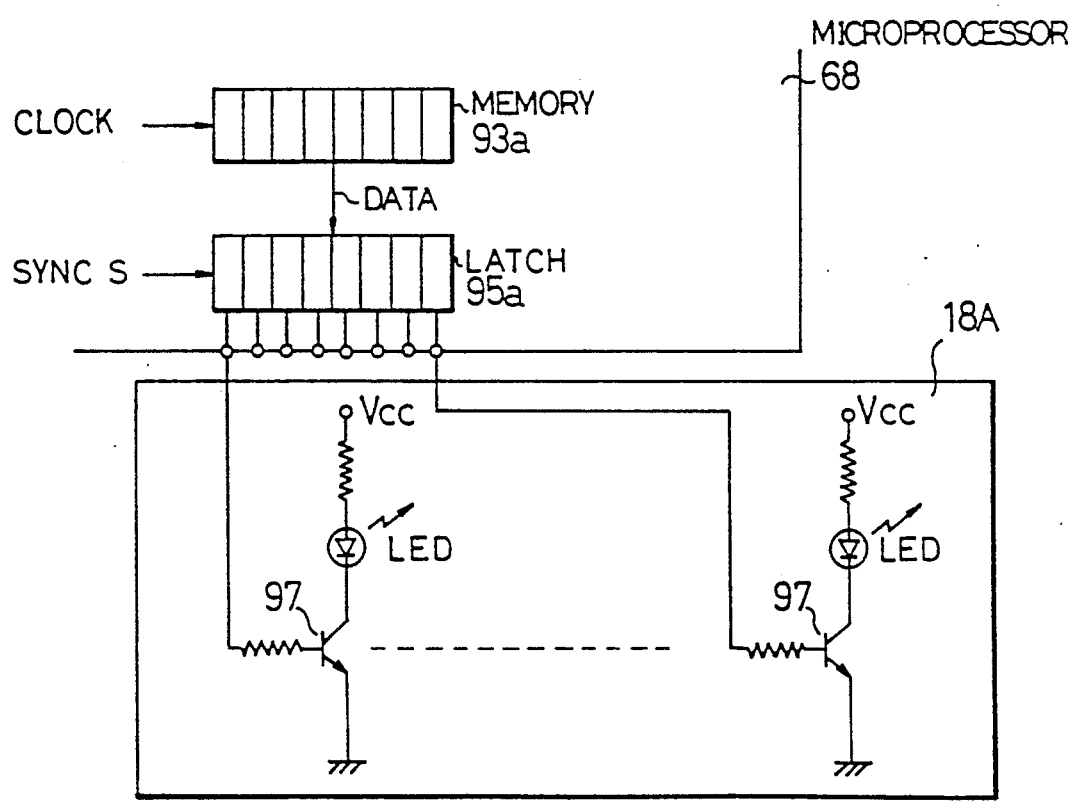

A display controller 47 outputs reception data to be displayed to a display unit 18A (18B, 18C, 18D). The display controller 47 comprises an 8-bit latch circuit 95 employed in an output interface of the microcomputer. This latch circuit 95 temporarily stores the data derived from a memory 93a into which the reception data have been stored. An output of the latch circuit 95 is connected to a base terminal of a transistor 97 of the display unit 18A to turn ON and LED corresponding to a function of the terminal unit 20A, as shown in FIG. 13A.

Figure 13B:
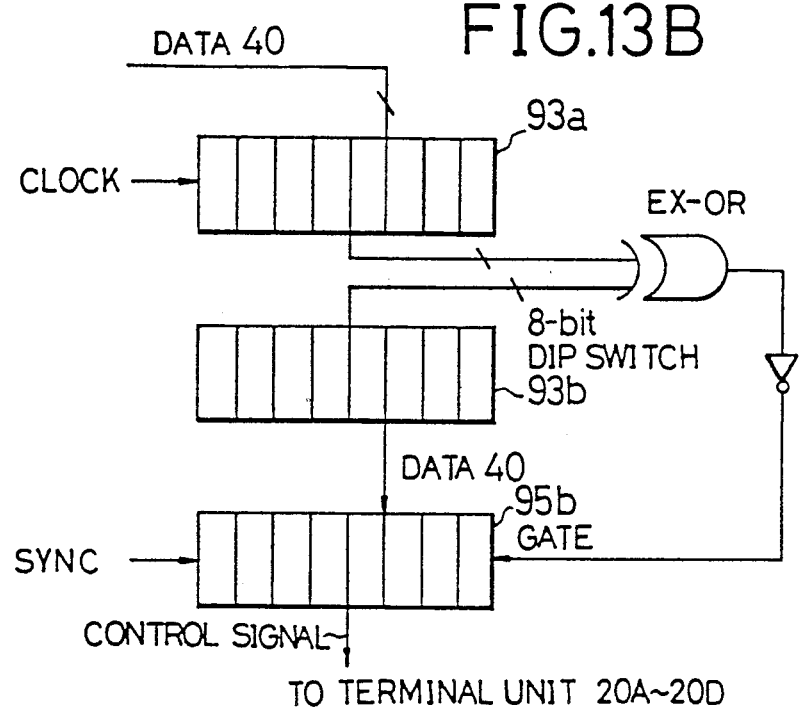
Figure 13C:
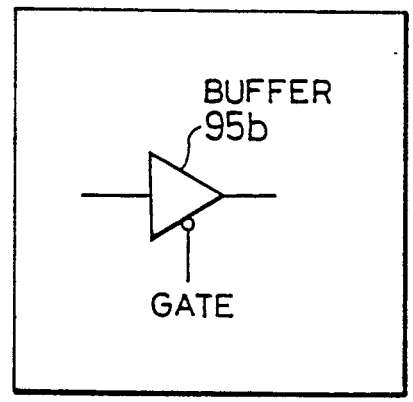

In the communication unit, it is determined, according to the received data 40, whether or not the data will be given to the terminal unit to be controlled as shown in FIG. 13B. To expedite the determination, there is employed an 8-bit dip switch 93b. The dip switch 93b outputs data corresponding to the function of the terminal unit. Both the bits of the dip switch 93b and the bits of the received data 40 are exclusive-OR gated. If all bits become 1 as a result of the exclusive OR gating operation, it means that the received data 40 coincides with the function represented by the dip switch 93b. Only in this case, a gate of the buffer 95b, shown in FIG. 13C, i.e., the output interface is opened to output the communication data from the communication unit to the terminal unit via the signal transmission line 30.

Third Data and Power Transmitting/Receiving System 400

A data and power transmitting/receiving system 400 of the third embodiment will now be described. Since the system 400 has substantially the same circuit arrangement as that of the system 200 of the first embodiment, only a circuit different from the system 200 will be described.

A logic calculator 16 is the same as the logic calculator of the first embodiment shown in FIG. 2.

A common data format communicated between communication units 10A to 10D is the same as that of the first embodiment.

Data conversion from parallel data to serial data is carried out as shown in FIG. 14. Instead of the parallel-to-serial converting shift register 90 (See FIG. 4C) for transmission of the first embodiment, a program is incorporated in a microcomputer. As shown in FIG. 14, bits in an accumulator 65 of the CPU of the microcomputer are shifted to upper positions bit by bit while the most significant bit is shifted to a position of the least significant bit (a left rotate instruction). The left rotate instruction and an instruction for outputting the contents of the accumulator 65 to a specific address Q are repeated alternately. As shown in FIG. 14, the most significant bit of the address Q is connected to a data input terminal of a transmission line.

Data conversion from serial data to parallel data is carried out as shown in FIG. 15. The serial-to-parallel converting shift register 84 (See FIG. 11) for reception is replaced with a program incorporated in the microcomputer. According to the program, an instruction is executed to transfer the demodulated serial data to the most significant bit of another specific address N, set other bits of the address N to 0, and transfer the data from the address N to the accumulator 65 of the CPU of the microcomputer. Then, the left rotate instruction is carried out to shift the data in the accumulator to upper positions bit by bit while shifting the most significant bit to a position of the least significant bit. Then, an instruction is carried out to obtain an OR gating operation between the left-rotated data and the next serial data set to the address N with a new data at the most significant bit and 0 for the remaining bits. These instructions are combined in the program to convert the serial data into the parallel data.

Other arrangements of this third embodiment are the same as those of the first embodiment.

Figure 16:
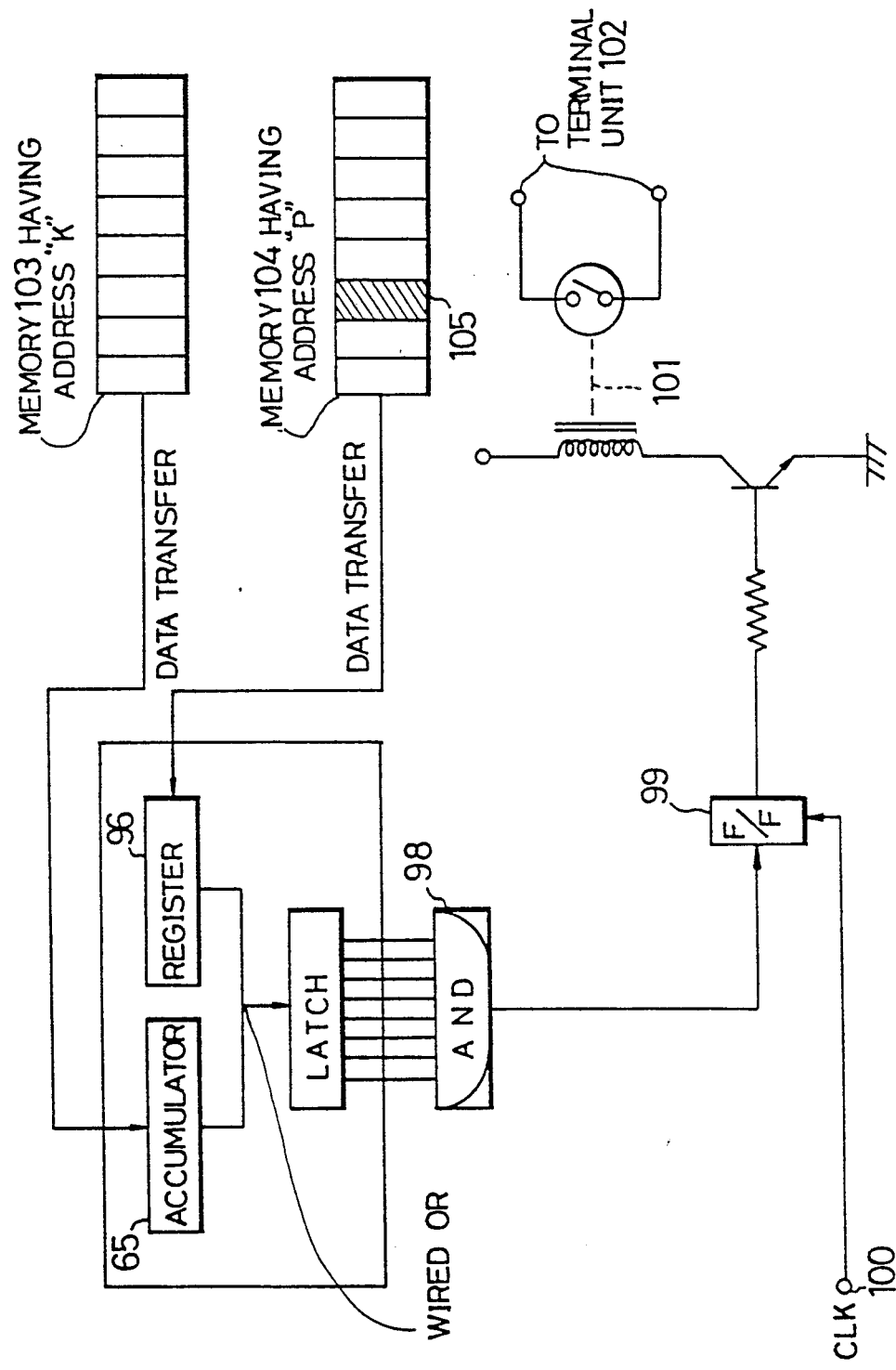
FIG. 16 is a schematic illustration for explaining overall operations of the systems 100 to 400.

FIG. 16 is a schematic block diagram showing basic operation of the data and power transmitting/receiving system according to the invention.

A plurality of communication units simultaneously can transmit and receive the communication data 40 each combined with a single sync signal 50. Each of the communication data contains the destination and content of communication specific to the relevant communication unit and terminal unit. Since this communication data owns the identifiable format, the operations of the selected terminal units can be freely stopped, commenced, and left as they are. In addition, communication speed between a plurality of controllers, i.e., communication units and terminal units can be improved.

In other words, a sync signal is added to n-bit data ("n" is an integer), n bits thereof representing operation conditions of "n" terminal units. According to the systems of the invention, such as information signal can be simultaneously transmitted and received between the communication units. This is because "n" communication units are connected to a common data bus in a wired-OR state. Since the information signal is simultaneously transmitted and received, communication speed of the invention systems can be remarkably improved as compared with the conventional systems.

In addition, the systems of the invention can utilize the sync signal as power source to the terminal units.

Therefore, various information such as operating conditions of the terminal units can be transmitted and received through the single common data bus between the communication units. Further, the information as well as electric power can be transmitted and received with respect to the terminal units in a time divisional (sequential) method.

Fourth Data and Power Transmitting/Receiving System 500

A hot-water supply system fueled by gas according to a fourth embodiment of the invention will now be described in detail.

Figure 17:
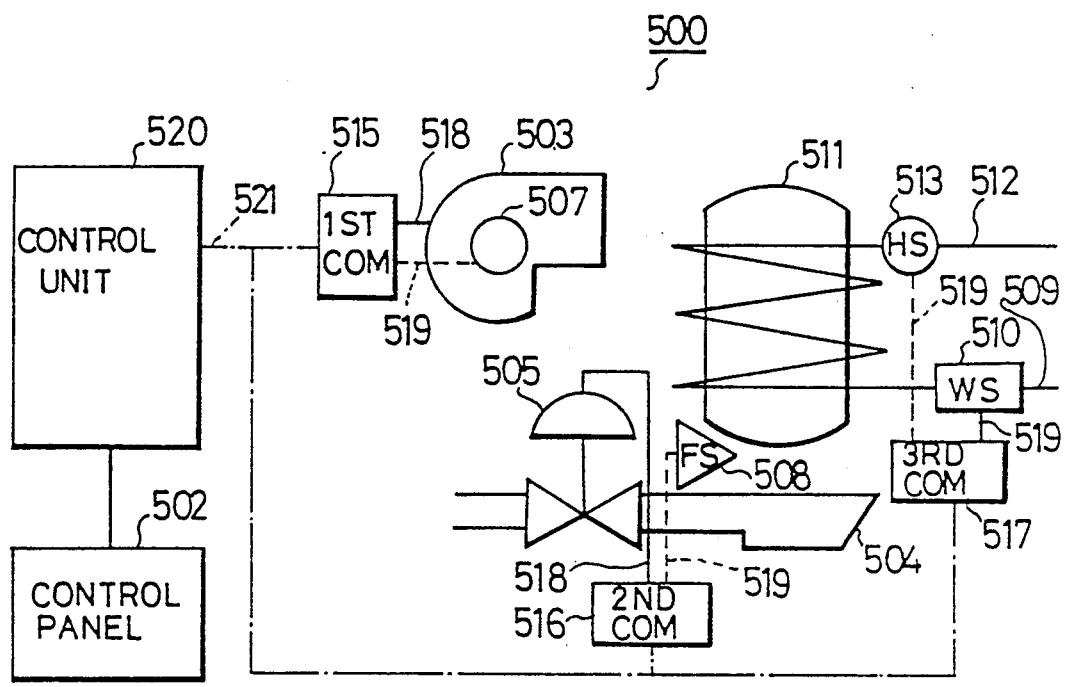
FIG. 17 is a schematic block diagram of a data and power transmitting/receiving system 500, according to a fourth preferred embodiment of the invention, applied to a hot water supplying system.

As shown in FIG. 17, a hot-water supplying system 500 fueled by gas according to the embodiment comprises an actuator (fan 503, a solenoid valve 505) and sensors (a rotation sensor 507, a flame sensor 508, a water level sensor 510 and a hot-water temperature sensor 513).

According to the present embodiment, a first data communication circuit 515 is arranged for the fan 503 and rotation sensor 507. A second data communication circuit 516 is arranged for the solenoid valve 505 and flame sensor 508. A third data communication circuit 517 is arranged for the water level sensor 510 and hot-water temperature sensor 513. The first to third communication circuits 515, 516 and 517 are connected to the respective actuators and sensors through a short control line 518 and a short signal line 519.

The data communication circuits 515, 516 and 517 are connected to a power/data communication line 521. The power/data communication line 521 is capable of supplying electricity as well as communicating data. The power/data communication line 521 is connected to a control unit 520. The control unit 520 is connected to a control panel 502.

Figure 18:
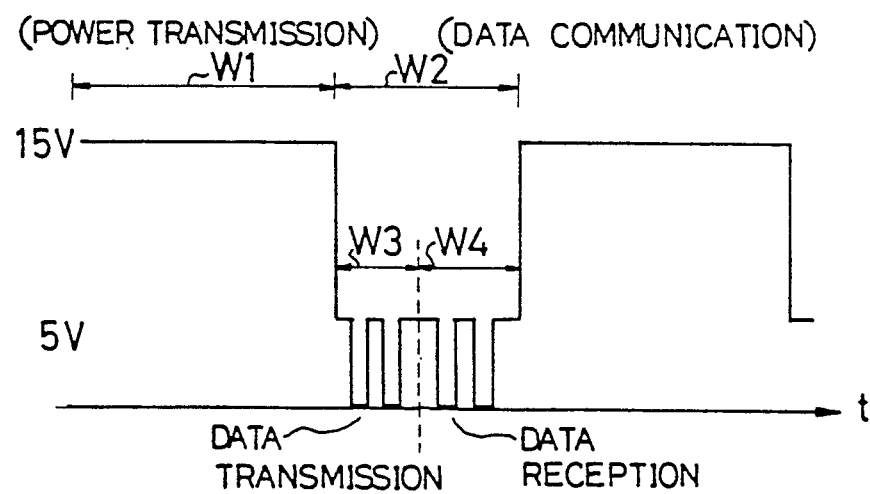
FIG. 18 is a waveform of a signal communicated in the system 500.

A signal transmitted through the power/data communication line 521 is controlled in a time divisional or sequential manner with respect to a time "t" as shown in FIG. 18. The power/data communication line 521 is used for supplying electricity in a time band W1 and for communicating data in the next time band W2. The time band W2 is further subdivided into a signal transmission time band W3 and a signal reception time band W4.

Internal Circuits of Control Unit/Control Panel

Figure 19:
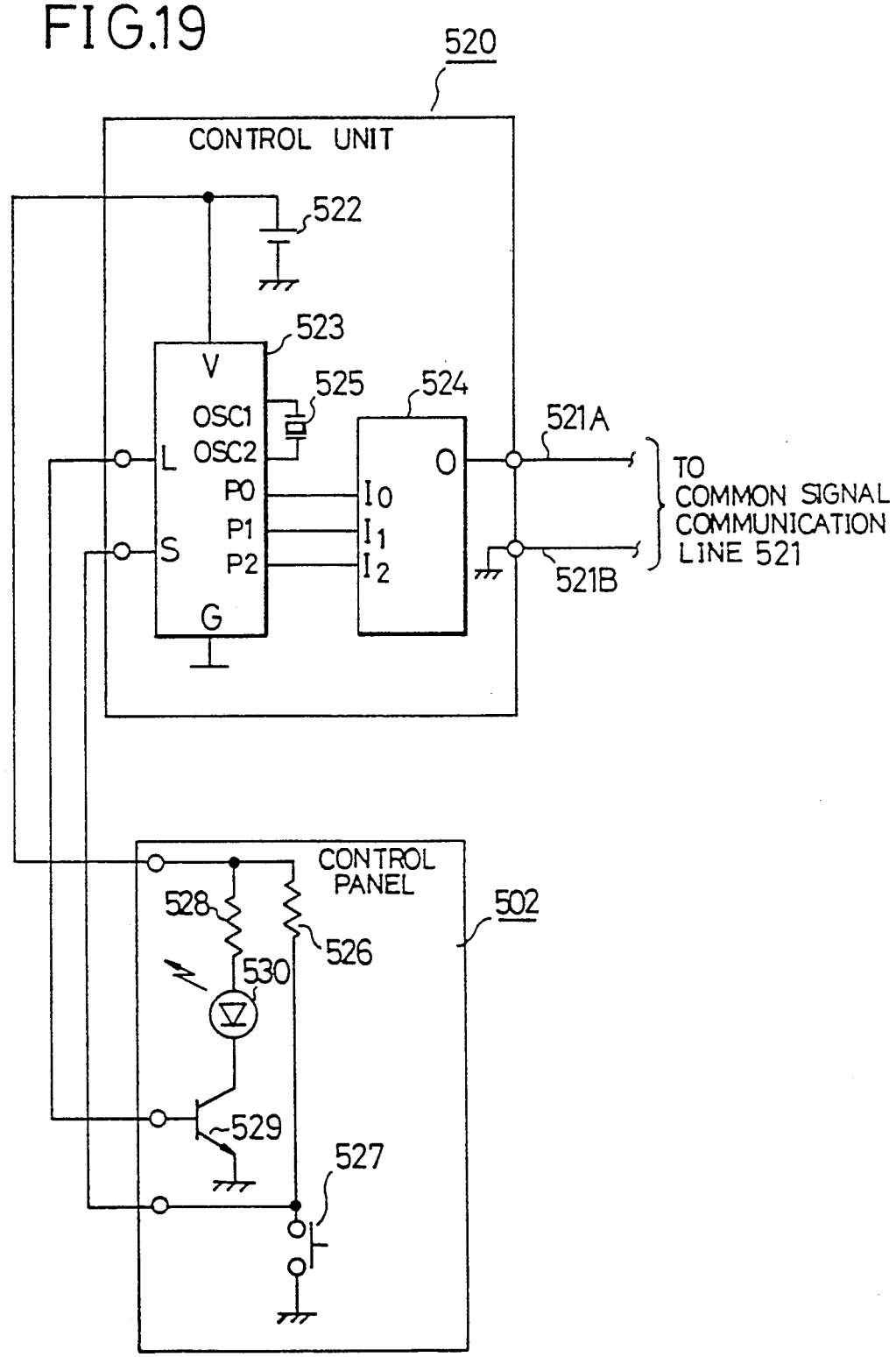
FIGS. 19 to 21 are circuit diagrams of the control unit and control panel employed in the system 500.

FIG. 19 shows internal circuits of the control panel 502 and control unit 520.

The control unit 520 comprises a 5-volt power source 522, a microcomputer 523 (HD6805U2 of Hitachi Ltd.,) and a data communication circuit 524.

A power source terminal V of the microcomputer 523 is connected to the power source 522. Input and output terminals L and S of the microcomputer 523 are connected to a switching mechanism of the control panel 502 to be described later. A grounding terminal G of the microcomputer 523 is grounded to a printed circuit board. Terminals OSC1 and OSC2 of the microcomputer 523 are connected to a crystal oscillator 525. Three ports P0, P1 and P2 of the microcomputer 523 are connected to three ports I0, I1 and I2 of the data communication circuit 524.

An output terminal O of the data communication circuit 524 is connected to a voltage line 521A of the power/data communication line 521. The power/data communication line 521 comprises the voltage line 521A and a grounding line 521B. One end of the grounding line 521B is grounded to the circuit board of the control unit 520.

The control panel 502 is provided with a voltage of 5 V from the power source 522 through a resistor 526. The control panel 502 comprises the switching mechanism including a switch 527. When turned ON, the switch 527 lowers a potential of the input terminal S of the microcomputer 523 to a grounding voltage. The switching mechanism further includes an LED lamp 530. The LED lamp 530 receives a voltage of 5 V through a resistor 528 and is lighted up in response to activation of a transistor 529. The transistor 529 is operated according to a voltage of 5 V outputted from the output terminal L of the microcomputer 523.

If the switch 527 is depressed in the arrangement of the control panel 502 and control unit 520, the microcomputer 523 may recognize the fact that the switch 527 has been depressed, through the input terminal S. Then, the output terminal L of the microcomputer 523 outputs a voltage of 5 V to light up the LED lamp 530 to indicate an operating state.

After receiving an instruction due to the operation of the switch, the microcomputer 523 communicates with the ports I0, I1 and I2 of the data communication circuit 524 through the ports P0, P1 and P2. Thus, two-way communication is established with respect to the actuators and sensors shown in FIG. 17 via the power/data communication line 521.

Detailed Circuit of Data Communication Circuit Within Control Unit

Figure 20:
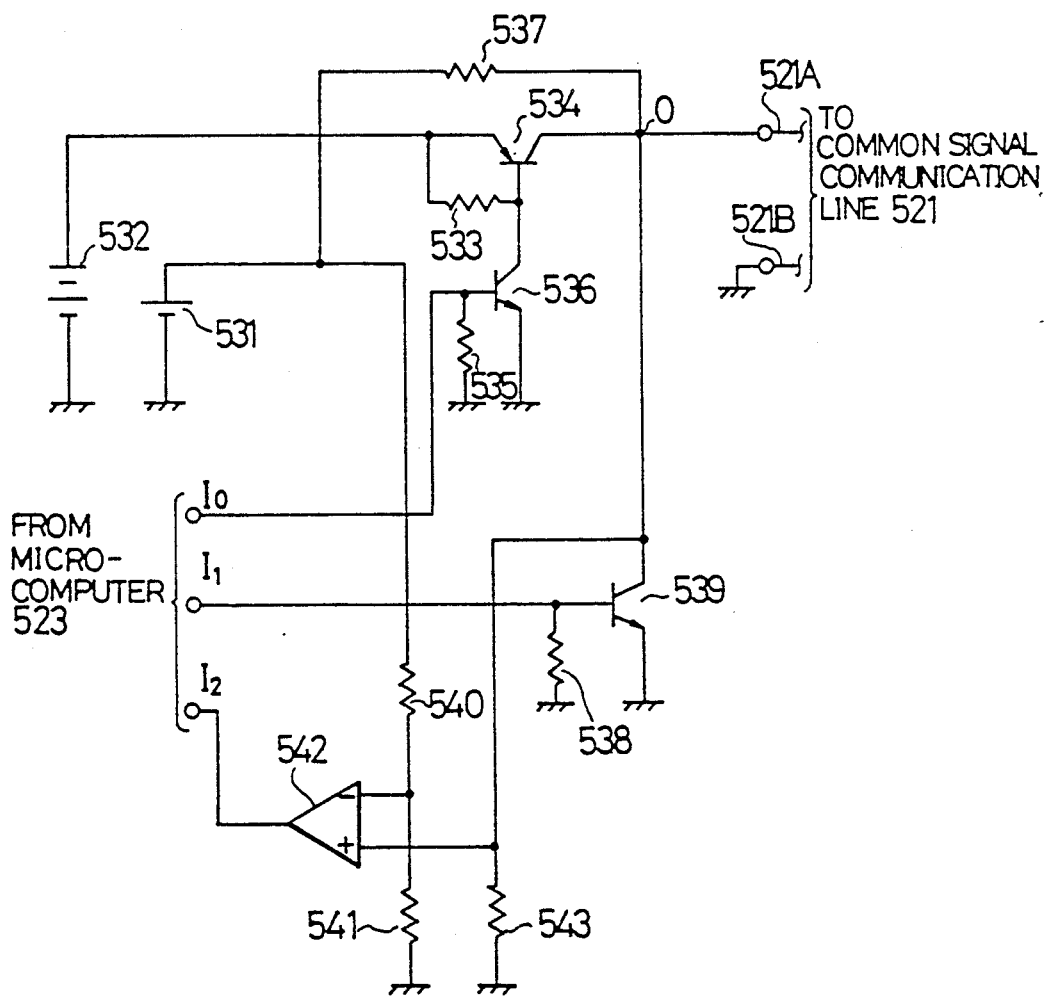

As shown in FIG. 20 in detail, the data communication circuit 524 of the control unit 520 comprises a 5-volt power source 531 and a 15-volt power source 532 for supplying electric power.

The 15-volt power source 532 is connected to the voltage line 521A of the power/data communication line 521 through a transistor 534. The transistor 534 is provided with a bias resistor 533.

In the power supply time band W1 shown in FIG. 18, the microcomputer 523 activates transistors 536 and 534 through the port I0 to supply a voltage of 15 V to the voltage line 521A.

A base of the transistor 534 is connected to the port I0 through a transistor 536. The transistor 536 is provided with a bias resistor 535.

The 5-volt power source 531 is connected to the voltage line 521A through a communication pull-up resistor 537. A node "0" between the power source 531 and the resistor 537 is connected to the port I1 through a transistor 539. The transistor 539 is provided with a bias resistor 538.

In the data transmission time band W3 shown in FIG. 18, the microcomputer 523 sends a data transmission command to the input port I1 to activate the transistor 539. As a result, a DC data signal is transmitted to the voltage line 521A.

The power source 531 is grounded through voltage dividing resistors 540 and 541. A junction between the resistors 540 and 541 is connected to a negative (−) terminal of a comparator 542. An output terminal of the comparator 542 is connected to the port I2. A positive (+) terminal of the comparator 42 is connected to the voltage line 521A via a connection line. The connection line is grounded through a resistor 543.

In the data reception time band W4 shown in FIG. 18, the comparator 542 is operated according to a potential change in the voltage line 521A. The data supplied through the voltage line 521A is given to the microcomputer 523 through the port I2.

Detailed Circuit of First Data Communication Circuit Within Fan Circuit

Figure 21:
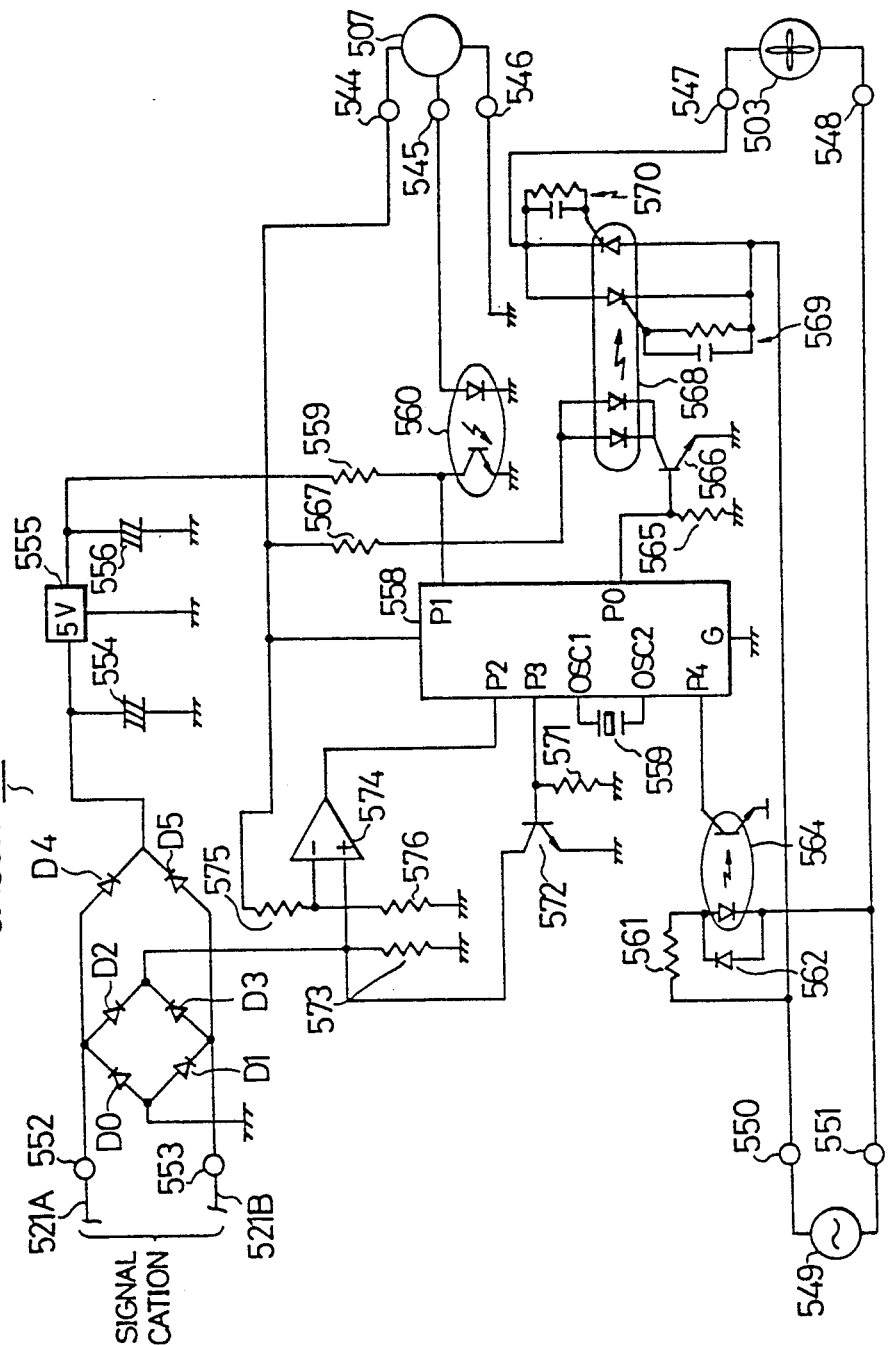

FIG. 21 is a circuit diagram showning the details of the first data communication circuit 515 connected to the fan 503, among the data communication circuits on the actuator and sensor side.

As shown in the figure, the first data communication circuit 515 of the fan 503 is connected to the control unit 520 via the power/data communication line 521. The first data communication circuit 515 is connected to the sensor 507 through a power source supplying terminal 544, a sensor signal input terminal 545 and a grounding terminal 546. The first data communication circuit 515 is connected to the fan 503 through connection terminals 547 and 548. A driving power source of the fan 503 is an AC power source 549 of 100 V according to the preferred embodiment. The AC power source 549 is connected to the fan 503 through terminals 550 and 551.

The power/data communication line 521 is connected to a power accumulating capacitor 554 and to an input terminal of a 3-terminal regulator 555 via terminals 552 and 553, a bridge circuit and diodes D4 and D5. The bridge circuit comprises diodes D0, D1, D2 and D3. One end of the power accumulating capacitor 554 is grounded. An output terminal of the 3-terminal regulator 555 is connected to a voltage smoothing capacitor 556. The other end of the voltage smoothing capacitor 556 is grounded.

In the power supply time band W1 shown in FIG. 18, the power line 521A is supplied with a voltage of 15 V. Then, the capacitor 554 is charged to output a stable power source voltage of 5 V from the output terminal of the 3-terminal regulator 555.

In the center of the circuit 515, a microcomputer 558 is arranged. Terminals OSC1 and OSC2 of the microcomputer 558 are connected to a crystal oscillator 557. The microcomputer 558 has a power source terminal V for receiving a voltage of 5 V from the 3-terminal regulator 555. The microcomputer further employs a grounding terminal G and five ports P0, P1, P2, P3 and P4.

The port P1 is used to receive the number of rotations detected by the rotation sensor 507.

The rotation sensor 507 receives a voltage of 5 V from the 3-terminal regulator 555 via the terminal 544 to output pulse signals in response to the number of rotations to the terminal 545. The pulse signals are inputted to the port P1 via photocoupler 560 for a noise eliminating purpose. The photocoupler 560 receives a voltage of 5 V through a resistor 559 and grounds the received voltage to provide a positive output voltage.

The port P4 is used to detect a phase of the AC power source 549. The port P0 controls the phase of the AC power source 549 to drive the fan 503.

The input terminals 550 and 551 of the AC power source 549 are connected to a series circuit comprising a resistor 561 and a diode 562. A diode 564 of a photocoupler 563 is connected in parallel with the diode 562. An output terminal of the photocoupler 563 is connected to the port P4 to detect a phase of the AC power source 549 according to a voltage input to the port P4.

The port P0 is connected to a transistor 566. The transistor 566 is provided with a bias resistor 565. The transistor 566 activates a thyristor driving type photocoupler 568 to provide predetermined electricity to the fan 503. The photocoupler 568 receives a voltage of 5 V through a resistor 567. The photocoupler 568 is connected to snubber circuits 569 and 570 for absorbing surge.

According to the phase of the AC power source 549 to be inputted to the port P4, the microcomputer 558 activates the transistor 566 to control the phase of the AC power source through the photocoupler 568, thus driving the fan 503 at a required rotational speed.

According to an input signal from the rotation sensor 507 to the port P1, the port P3 transmits predetermined data to the control unit 520.

The port P3 is connected to a transistor 572. The transistor 572 is provided with a bias resistor 571. An output terminal of the transistor 572 is grounded through a resistor 573. At the time of communication, the output terminal of the transistor 572 is connected to the power/data communication line 521 via output terminals of the diodes D2 and D3. The output terminals of the diodes D2 and D3 are set to 5 V.

In the time band W4 shown in FIG. 18 for data reception for the control unit 520, a pulse wave corresponding to the transmission data is given to the port P3 to lower a potential of the voltage line 521A from 5 V to 0 V according to activation of the transistor 571. As a result, the data containing codes each of 1 or 0 can be transmitted to the control unit 520.

The port P2 is used to receive the data transmitted from the control unit 520.

The power/data communication line 521 is connected to a positive (+) terminal of a comparator 574 via the diodes D2 and D3. A negative (−) terminal of the comparator 574 is connected to a node between series resistors 575 and 576. The series resistors 575 and 576 are connected to the 3-terminal regulator 555. An output terminal of the comparator 574 is connected to the port P2.

The negative (−) terminal of the comparator 574 receives a reference voltage smaller than 5 V. The positive (+) terminal of the comparator 574 receives a voltage in the range of 0 to 5 V. The voltages applied to the negative and positive terminals of the comparator 574 are compared with each other in the comparator 574. Then, according to a voltage state of the power/data communication line 521, a data transmitted through the power/data communication line 521 is inputted to the port P2 in the time band W3 shown in FIG. 18.

Overall Operation of Fourth System

The control unit 520 and the data communication circuit 515 of fan 503 shown in FIG. 17 can supply electric power and communicate data through the power/data communication line 521 to properly control rotation of the fan 503.

The control unit 520 controls time based on the crystal oscillator 525 shown in FIG. 19. According to the time divisional operation shown in FIG. 18, the control unit 520 determines the power supply and communication time bands W1 and W2 (W3, W4) to carry out the power supply and data communication in the respective time bands.

The data communication circuit 515 shown in FIG. 21 is provided with another crystal oscillator 557. The oscillation of the crystal oscillator 557 is synchronized with that of the crystal oscillator 525 with the use of proper data or a waveform of data to carry out data communication by using various DC signals such as single current signals, single current RZ signals and 0 inverting signals.

Similarly, the control unit 520 can supply electric power and communicate data with respect to the second data communication circuit 516 connected to the solenoid valve 505 and flame sensor 508, and with respect to the third data communication circuit 517 connected to the water level sensor 510 and hot-water temperature sensor 513. The control unit 520 can properly control the respective actuators according to output signals of the respective sensors.

The control unit 520 and data communication circuits 515, 516 and 517 are connected to each other only through the power/data communication line 521 comprising the power line 521A and grounding line 521B so that connection may be easily performed, and occurences of line disconnection and noise may be avoided.

In this embodiment, the power/data communication line 521 has been used to supply power and communicate data. Namely, the embodiment is based on a low-voltage DC type power-line-transmission system. Alternatively, a general AC type power-line-transmission system may be adopted. In this case, a proper modem is used to transmit a data signal of 100 to 200 KHz with an AC of 100 V. In this arrangement, the AC power source 549 for the fan 503 may be omitted.

In the embodiment, the data communication circuits 515, 516 and 517 for the actuators and sensors have been controlled by the control unit 520. Alternatively, the microcomputer 558 may contain a program to independently control the data communication circuits according to an output of the rotation sensor 507. Namely, the data communication circuits act as control centers to separately control the respective actuators to reduce the load on the control unit 520 and further improve reliability.

The data communication circuits shown in FIG. 21 may be integrated to one or a plurality of standard circuits. By slightly modifying a program in the microcomputer 558, the actuators and sensors may be adopted for the standard circuits.

The present invention is not limited by the above-described embodiments but proper modifications may be made on the design of the invention to achieve the invention in various forms.

As described above, the present invention causes no erroneous operation due to external noise and line disconnection, and makes connection and maintenance tasks easier.

What is claimed is:

1. A data and power transmitting/receiving system comprising:
   a plurality of terminal means (20A ... 20N) selectively operable for producing specific data (40) for utilization by the respective terminal means;
   a plurality of communication means (10A ... 10N) connected to the corresponding terminal units, including:
   at least a sync signal generator for generating a sync signal and superimposing the sync signal on the specific data in a time-division mode to produce a data signal (45), and
   a data processing unit (4A ... 4N) operative for processing the data signal to determine a controlling condition of the respective terminal means (20A ... 20N) and for producing power for driving the data processing units; and
   a common signal transmission line (30) for connecting said plurality of communication means so as to communicate the data signal with the communication means, whereby simultaneous data transmission and reception are carried out between the communication means.

2. A data power transmitting/receiving system as claimed in claim 1, wherein each of said terminal means includes:
- a plurality of switches (72a ... 72d) operative to generate data signals to which the respective terminal means is responsive so as to produce the data signal, and
- a lamp (71a ... 71d) corresponding to one of the switches included with each terminal means and operated in response to a data signal generated by operation of that switch at any of the terminal means.

3. A data and power transmitting/receiving system as claimed in claim 2, further comprising a plurality of display unit (18) each including a plurality of light emitting diodes operative to indicate which of the lamps (71a ... 71d) is illuminated.

4. A data and power transmitting/receiving system as claim in claim 3, wherein each of said communication means includes:
- means (11) for generating a sync signal (50) at a predetermined time interval to determining a starting instant of both data transmission and reception;
- means (12) responsive to the sync signal for determining whether or not the sync signal is transmitted prior to the specific data (40);
- means (13) for transmitting the specific data and sync signal as the data signal (45) via the common signal transmission line (30) to other communication means;
- means (14) for demodulating the data signal received via the signal transmission line from other communication means;
- means (15) for discriminating the specific data from the sync signal; and
- means (16) connected between the terminal means (20A ... 20N), transmitting means (13), demodulating means (14), and discriminating means (15), for processing the sync signal and data to control the terminal means, whereby the simultaneous data transmission and reception are carried out between the communication means (10A ... 10N).

5. A data and power transmitting/receiving system as claimed in claim 4, wherein said processing means includes;
- data conversion means (17) connected between the corresponding terminal means (20A, 10) and the transmitting means (20A ... 20N) and transmitting means (13) for converting said specific data (40) derived from the switches of the corresponding terminal means into a discriminatable data form;
- data decrypting means (20) for decrypting the data signal demodulated by the demodulating means to produce a decrypted data signal;
- display controlling means (23) responsive to the decrypted data signal for controlling the display unit (18A) to display the decrypted data signal thereon; and
- means (21, 24) responsive to the decrypted data signal for determining whether or not a control signal is supplied to the lamp (71A ... 71D) of the corresponding terminal means (24A).

6. A data and power transmitting/receiving system as claimed in claim 1, wherein said common signal transmission line is constructed of two lines.

7. A data and power transmitting/receiving system as claimed in claim 1, wherein said sync signal generator is constructed of a clock signal generator (69) and a frequency divider circuit (70) for frequency-dividing the clock signal to obtain said sync signal (50).

8. A data and power transmitting/receiving system as claimed in claim 1, wherein the voltage level of said sync signal (50) is higher than that of said specific data (40).

9. A data and power transmitting/receiving system as claimed in claim 1, wherein each of said communication means includes a power source circuit (70) having a rectifer operative to rectify the sync signal and a capacitor operative to receive and store the rectified sync signal therein to produce DC power.

10. A data and power transmitting/receiving system as claimed in claim 1, where each of said terminal means includes:
- a plurality of actuators A (503 ... 505) operative to control corresponding plural loads,
- a plurality of sensors B (507 ... 509) responsive to predetermined conditions affected by operation of the corresponding loads, and
- at least one data communication circuit C(515/516/517) connected to a selected actuator and to the sensor responsive to the predetermined condition of the corresponding load;
- each of said communication means includes;
- a control panel (502), and
- a control unit (520) connected to the control panel; and
- said common signal transmission line comprises a power/data communication line (521) connected to the control unit and to the data communication circuits and selectively operative to supply electrical power to operate the actuators as well as communicating signals with respect to the sensors.

11. A data and power transmitting/receiving system as claimed in claim 10, wherein said control panel includes;
- a transistor (529);
- a light emitting diode (53) connected to the collector of the transistor; and
- a switch (527) for turning ON/OFF said control unit (520), whereby the light emitting diode is turned ON/OFF in response to switching operations of the switch.

12. A data and power transmitting/receiving system as claimed in claim 10, wherein said control unit includes a first microprocessor (523) for processing the specific data (40) so as to obtain the data signal (45) to be transferred.

13. A data and power transmitting/receiving system as claimed in claim 10, wherein said data communication circuit (524) employed in said terminal means includes a second microcomputer (528) for processing the data signal transferred from the control unit (520) so as to obtain the specific data for controlling said actuators and for processing output signals derived from said sensors (507, 508, 510 ... 519) in order to obtain sensor signals to be transferred to said communication means.

14. A data and power transmitting/receiving system as claimed in claim 1, wherein said plurality of communication means (10A ... 10N) are connected to said common signal transmission line (30) in such a manner that connecting said communication means establishes a wired-OR logic circuit in conjunction with said transmission line.

* * * * *